US009310344B2

(12) United States Patent
Liu et al.

(10) Patent No.: US 9,310,344 B2
(45) Date of Patent: Apr. 12, 2016

(54) HILIC/ANION-EXCHANGE/CATION-EXCHANGE MULTIMODAL MEDIA

(71) Applicants: Xiaodong Liu, Cupertino, CA (US); Christopher A. Pohl, Union City, CA (US); Jinhua Chen, San Jose, CA (US)

(72) Inventors: Xiaodong Liu, Cupertino, CA (US); Christopher A. Pohl, Union City, CA (US); Jinhua Chen, San Jose, CA (US)

(73) Assignee: DIONEX CORPORATION, Sunnyvale, CA (US)

( * ) Notice: Subject to any disclaimer, the term of this patent is extended or adjusted under 35 U.S.C. 154(b) by 274 days.

(21) Appl. No.: 13/918,481

(22) Filed: Jun. 14, 2013

(65) Prior Publication Data

US 2014/0370614 A1    Dec. 18, 2014

(51) Int. Cl.
*G01N 31/02* (2006.01)
*B01J 20/281* (2006.01)

(52) U.S. Cl.
CPC .................................... *G01N 30/482* (2013.01)

(58) Field of Classification Search
None
See application file for complete search history.

(56) References Cited

U.S. PATENT DOCUMENTS

| 4,101,460 A | 7/1978 | Small et al. |
| 4,119,580 A | 10/1978 | Smith, Jr. et al. |
| 4,351,909 A | 9/1982 | Stevens et al. |
| 4,376,047 A | 3/1983 | Pohl |
| 4,382,124 A | 5/1983 | Meitzner et al. |
| 4,383,047 A | 5/1983 | Stevens et al. |
| 4,519,905 A | 5/1985 | Stevens et al. |
| 4,833,083 A | 5/1989 | Saxena |
| 4,927,539 A | 5/1990 | Stevens et al. |
| 5,024,767 A | 6/1991 | Kubo et al. |
| 5,030,352 A | 7/1991 | Varady et al. |
| 5,130,343 A | 7/1992 | Frechet et al. |
| 5,260,094 A | 11/1993 | Giannelis et al. |
| 5,324,752 A | 6/1994 | Barretto et al. |
| 5,334,310 A | 8/1994 | Frechet et al. |
| 5,431,807 A | 7/1995 | Frechet et al. |
| 5,453,185 A | 9/1995 | Frechet et al. |
| 5,532,279 A | 7/1996 | Barretto et al. |
| 5,597,489 A | 1/1997 | Schneider et al. |
| 5,728,457 A | 3/1998 | Frechet et al. |
| 5,865,994 A | 2/1999 | Riviello |
| 5,925,253 A | 7/1999 | Pohl et al. |

(Continued)

FOREIGN PATENT DOCUMENTS

| CN | 1759931 A | 4/2006 |
| CN | 102179238 A | 9/2011 |

(Continued)

OTHER PUBLICATIONS

Kalay et al., "Online nanoliquid chromatography-mass spectrometry and nanofluorescence detection for high-resolution quantitative N-glycan analysis," Anal. Biochem. 423, 153-162, 2012.

(Continued)

*Primary Examiner* — Robert Xu
(74) *Attorney, Agent, or Firm* — Jeffry S. Mann

(57) ABSTRACT

The present invention provides an agglomerated multimodal chromatographic medium. the medium of the invention includes groups active in anion exchange, cation exchange and hydrophilic interaction chromatographic modalities. The invention provides methods of making these media and using them in separations of analytes. Also provided are separations devices incorporating the medium and systems incorporating these separations devices.

25 Claims, 16 Drawing Sheets

Type I

Type II

Nano-sized anionic polymer particle

Cationic group in the hydrophilic moiety attached to solid substrate surface

Nano-sized cationic polymer particle

Anionic group in the hydrophilic moiety attached to solid substrate surface

(56) References Cited

U.S. PATENT DOCUMENTS

| | | | |
|---|---|---|---|
| 5,929,214 | A | 7/1999 | Peters et al. |
| 5,936,003 | A | 8/1999 | Pohl et al. |
| 5,968,363 | A | 10/1999 | Riviello et al. |
| 6,045,842 | A | 4/2000 | Mozaffar et al. |
| 6,096,870 | A | 8/2000 | Mozaffar et al. |
| 6,248,798 | B1 | 6/2001 | Slingsby et al. |
| 6,528,167 | B2 | 3/2003 | O'Gara |
| 6,544,484 | B1 | 4/2003 | Kaufman et al. |
| 6,568,245 | B2 | 5/2003 | Kaufman |
| 6,887,384 | B1 | 5/2005 | Frechet et al. |
| 6,987,183 | B2 | 1/2006 | Heikkila et al. |
| 7,074,331 | B2 | 7/2006 | Allington et al. |
| 7,238,426 | B2 | 7/2007 | Jiang et al. |
| 7,303,671 | B2 | 12/2007 | Srinivasan et al. |
| 7,767,462 | B2 | 8/2010 | Liu et al. |
| 7,811,453 | B2 | 10/2010 | Yotani et al. |
| 7,847,936 | B2 | 12/2010 | Jarrell |
| 7,911,609 | B2 | 3/2011 | Jarrell |
| 8,089,627 | B2 | 1/2012 | Jarrell |
| 8,182,679 | B2 | 5/2012 | Liu et al. |
| 8,246,832 | B2 | 8/2012 | Lomas et al. |
| 8,304,250 | B2 | 11/2012 | Parsons et al. |
| 8,497,358 | B2 | 7/2013 | Suenaga et al. |
| 2004/0147033 | A1 | 7/2004 | Shriver et al. |
| 2005/0064192 | A1 | 3/2005 | Jiang et al. |
| 2005/0092910 | A1 | 5/2005 | Geromanos et al. |
| 2005/0161399 | A1 | 7/2005 | Dillon et al. |
| 2006/0054559 | A1 | 3/2006 | Liu et al. |
| 2006/0070937 | A1 | 4/2006 | Rustamov et al. |
| 2007/0062854 | A1 | 3/2007 | Pohl et al. |
| 2008/0118932 | A1 | 5/2008 | Toler et al. |
| 2008/0164211 | A1 | 7/2008 | Lindner et al. |
| 2008/0207487 | A1 | 8/2008 | DeFrees et al. |
| 2008/0219952 | A1 | 9/2008 | Fischer et al. |
| 2009/0277838 | A1 | 11/2009 | Liu et al. |
| 2009/0324617 | A1 | 12/2009 | Satomaa et al. |
| 2010/0075375 | A1 | 3/2010 | Defrees et al. |
| 2010/0320149 | A1 | 12/2010 | Axen et al. |
| 2011/0117601 | A1 | 5/2011 | Haberger et al. |
| 2011/0284465 | A1 | 11/2011 | Liu et al. |
| 2012/0308549 | A1 | 12/2012 | Fogh et al. |

FOREIGN PATENT DOCUMENTS

| | | |
|---|---|---|
| EP | 0462795 A2 | 12/1991 |
| GB | 2194900 A2 | 3/1988 |
| WO | 03022433 A2 | 3/2003 |
| WO | 2005047886 A1 | 5/2005 |
| WO | 2006088760 A1 | 8/2006 |
| WO | 2008086357 A3 | 7/2008 |
| WO | 2008128225 A1 | 10/2008 |
| WO | 2009137275 A1 | 11/2009 |
| WO | 2010068272 A1 | 6/2010 |

OTHER PUBLICATIONS

Kallberg et al., "Application of a pH responsive multimodal hydrophobic interaction chromatography medium for the analysis of glycosylated proteins," J Chromatography A, 1218(5), 678-683, 2011.
Townsend et al., "Multimode High-Performance Liquid Chromatography of Fluorescently Labeled Oligosaccharides from Glycoproteins," Anal. Biochem., 239, 200-207, 1996.
Anumula, "High-Sensitivity and High-Resolution Methods for Glycoprotein Analysis," Anal. Biochem. 283, 17-26 (2000).
Ruhaak et al., "Glycan Labeling Strategies and Their Use in Identification and Quantification," Anal. Bioanal. Chem. 397, 3457-3481 (2010).
Neville et al., "Development of a Single Column Method for the Separation of Lipid- and Protein-Derviced Oligosaccharides," J. of Proteome Res., 8, 681-687 (2009).
Spearman et al., "The Role of Glysosylation in Therapeutic Antibodies," Chapter 12, M. Al-Rubeai (ed.) Antibody Expression and Production, Cell Engineering 7, BOI 10.1007/978-94-007-1257-7_12, copyright Springer Science +Business Media V.V. 2011.
Tousi et al., "Technologies and Strategies for Glycoproteomics and Glycomics and Their Application to Clinical Biomarker Research," Anal. Methods, 3 20-32 (2011).
Takegawa et al., "Separation of Isomeric 2-aminopyridine Derivatized N-glycans and N-glycopeptides of Human Serium Immunoglobulin G by Using a Zwitterionic Type of Hydrophilic-interaction Chromatography," J. of Chromatography A,m 1113, 177-181 (2006).
Yamada et al., Recent Advances in the Analysis of Carbohydrates for Biomedical Use, J. of Pharm. and Biomed. Anal., 55, 702-727 (2011).
Thermo Scientific/Dionex Datasheet: Acclaim HILIC-10 Column for Separating Highly Hydrophilic Molecules, 6 pages, 2010.
Thermo Scientific/Dionex Datasheet: The Acclaim Mixed-Mode HILIC-1 Column, a Powerful Tool for Separating Polar Molecules, 6 pages, 2007.
Thermo Scientific/Dionex Datasheet: Acclaim Mixed-Mode Wax-1 Column, Total Control of Selectivity, 8 pages, 2007.
Takegawa et al., "Simple separation of isomeric sialylated N-glycopeptides by a zwitterionic type of hydrophilic interaction chromatography," J Sep Sci (2006) 29:2533-2540.
Pinkerton, T. C., "High-performance liquid chromatography packing materials for the analysis of small molecules in biological matrices by direct injection," J. Chromatogr., 544, (1991) 13.
Haginaka, J., "Drug determination in serum by liquid chromatography with restricted access stationary phases," Trends Anal Chem., 10, (1991) 17.
Berge et al., "Pharmaceutical salts," Journal of Pharmaceutical Science 1977, 66: 1-19.
Ikada et al., "Reaction of Poly(vinyl Alcohol) with Potassium Persulfate and Graft Copolymerization," Journal of Polymer Science, vol. 12, 1829-1839 (1974).
Maehr, "A Proposed New Convention for Graphic Presentation of Molecular Geometry and Topography," J. Chem. Ed., 62, 114-120 (1985).
Pohl et al., U.S. Appl. No. 11/753,934, filed May 25, 2007.
Minakuchi, et al., "Octadecylsilylated Porous Silica Rods as Separation Media for Reversed-Phase Liquid Chromatography," Anal. Chem., 68, 3498-3501, 1996.
Minackuchi et al., "Effect of Domain Size on the Performance of Octadecylsilylated Continuous Porous Silica Columns in Reversed-Phase Liquid Chromatography," J. Chromatogr., 797, 121-131, 1998.
Hutchinson, et al., "Preparation and Characterisation of Anion-Exchange Latex-Coated Silica Monoliths for Capillary Electrochromatography," J. Chromatogr., 1109, 10-18, 2006.
Glenn et al., "Ion Chromatography on a Latex-Coated Silica Monolith Column," J. Chromatogr., 1155, 8-14, 2007.
Majors, "Developments in HPLC Column Packing Design," LCGC LC Column Technology Supplement, Apr. 8-15, 2006.
Majors, "Developments in HPLC Column Technology (2006-2008)," LCGC LC Column Technology Supplement, Apr. 10-17, 2008.
Majors, New Chromatography Columns and Accessories at Pittcon 2008: Part I, LCGC North America, vol. 26, No. 3, pp. 238-254, Mar 2008.
Merck Datasheet: SeQuant, A practical guide to HILIC including ZIC-HILIC applications, copyright 2005-2008, 30 pages.
Deguchi et al., "Two-dimensional hydrophilic interaction chromatography coupling anion-exchange and hydrophilic interaction columns for separation of 2-pyridylamino derivatives of neutral and sialylated N-glycans," 1189(1-2), 169-74, 2008.
Gohlke et al., "Separation of N-glycans by HPLC," Methods Mol Biol, 446, 239-54, 2008.
Ibrahim et al., "Agglomerated Silica Monolithic Column for Hydrophilic Interaction LC," Journal of Separation Science, vol. 33:6-7, 773-778, 2010.
Kalay et al., "Enhanced glycan nanoprofiling by weak anion exchange preparative chromatography, mild acid desialylation, and nanoliquid chromatography-mass spectrometry with nanofluorescence detection," Electrophoresis, 34(16) 2350-6, 2013.
Kazarian et al., "Ion-exchange and hydrophobic interactions affecting selectivity for neutral and charged solutes on three structurally

(56) References Cited

OTHER PUBLICATIONS similar agglomerated ion-exchange and mixed-mode station phases," Analytica Chemica Acta, 803, pp. 143-153, 2013.

Lammerhofer et al., "Mixed-mode ion-exchangers and their comparative chromatographic characterization in reversed-phase and hydrophilic interaction chromatography elution modes," J. Separation Science, 31(14), 2572-88, 2008.

Liu et al., "HILIC Behavior of a Reversed-Phase/Cation Exchange/Anion Exchange Trimode Column," Journal of Separation Science, vol. 33: 6-7, 779-786, 2010.

Nogueira et al., "Alternative high-performance liquid chromatographic peptide separation and purification concept using a new mixed-mode reversed-phase/weak anion-exchange type stationary phase," J of Chromatography A, 1089 (1-2) 158-69, 2005.

Nogueira et al., "Silica-based monolithic columns with mixed-mode reversed-phase/weak anion-exchange selectivity principle for high-performance liquid chromatography," J Separation Science, 29(7), 966-78, 2006.

Rudd et al., "A high-performance liquid chromatography based strategy for rapid, sensitive sequencing of N-linked oligosaccharide modifications to proteins in sodium dodecyl sulphate polyacrylamide electrophoresis gel bands," Proteomics, 1(2), 285-94, 2001.

Wuhrer et al., "Two-dimensional HPLC separation with reverse-phase-nano-LC-MS/MS for the characterization of glycan pools after labeling with 2-aminobenzamide," Methods Mol Biol, 534, 79-91, 2009.

Yuen et al., "High-performance liquid chromatographic profiling of fluorescent labelled N-glycans on glycoproteins," 16 (4), 247-54, 2002.

Liu et al., "Chromatographic evaluation of reversed-phase/anion-exchange-cation-exchange trimodal stationary phases prepared by electrostatically driven self-assembly process," J of Chromatography, 1218(22), 3407-3412, 2011.

Shen et al., "Preparation and chromatographic evaluation of a cysteine-bonded zwitterionic hydrophilic interaction liquid chromatography stationary phase," J of Chromatogr A, 1228, 175-182, 2012.

Strege et al., "Mixed-mode anion-cation exchange/hydrophilic interaction liquid chromatography-electrospray mass spectrometry as an alternative to reversed phase for small molecule drug discovery," Anal Chem, 72(19), 4629-4633, 2000.

FIG. 16

| Trimodal Phase | Solid Support | HILIC/ion-exchange Solid Support | Nano-sized Charged Polymer Particles |
|---|---|---|---|
| 30 | Porous spherical silica particle (particle size, 3 μm; pore size, 120 Å; surface area, 300 m²/g) | 12 (HILIC/WCX) | 41 (SAX) |
| 31 | Porous spherical silica particle (particle size, 3 μm; pore size, 200 Å; surface area, 200 m²/g) | 13 (HILIC/WCX) | 41 (SAX) |
| 32 | Porous spherical silica particle (particle size, 3 μm; pore size, 300 Å; surface area, 100 m²/g) | 14 (HILIC/WCX) | 41 (SAX) |
| 33 | Porous spherical silica particle (particle size, 3 μm; pore size, 120 Å; surface area, 300 m²/g) | 15 (HILIC/WAX) | 42 (WCX) |
| 34 | Porous spherical silica particle (particle size, 5 μm; pore size, 120 Å; surface area, 300 m²/g) | 17 (HILIC/SAX) | 43 (SCX) |
| 35 | Porous spherical silica particle (particle size, 5 μm; pore size, 200 Å; surface area, 200 m²/g) | 18 (HILIC/WCX) | 41 (SAX) |
| 36 | Porous spherical silica particle (particle size, 3 μm; pore size, 200 Å; surface area, 200 m²/g) | 19 (HILIC/WCX) | 41 (SAX) |
| 37 | Porous spherical silica particle (particle size, 3 μm; pore size, 300 Å; surface area, 100 m²/g) | 20 (HILIC/WCX) | 41 (SAX) |
| 38 | Porous spherical silica particle (particle size, 5 μm; pore size, 300 Å; surface area, 100 m²/g) | 21 (HILIC/SCX) | 41 (SAX) |

HILIC/ANION-EXCHANGE/CATION-EXCHANGE MULTIMODAL MEDIA

FIELD OF THE INVENTION

This invention relates to compositions useful as stationary phases for chromatographic applications and methods of making and using the compositions in multi-modal separations.

BACKGROUND OF THE INVENTION

Selectivity, mainly governed by column chemistry, is the key in HPLC separation. Although reversed-phase columns (e.g., $C_{18}$) are most commonly used in pharmaceutical applications, they often fail to retain highly polar molecules (e.g., counter ions), and offer limited selectivities. Ion exchange (IEX) chromatography is used to separate ionic or ionizable molecules. However, it has limited use in small-molecule separations due to inadequate hydrophobic retention. Ion pairing chromatography can help to overcome the aforementioned difficulties, but it often requires extended equilibration time, a complicated mobile phase that is incompatible with MS, and a dedicated column.

Mixed-mode chromatography provides a viable solution to these challenges by using both reversed phase and ion-exchange retention mechanisms. One major advantage of this approach is that column selectivity can easily be modified by adjusting mobile phase ionic strength, pH and/or organic solvent concentration. As the result, not only is the selectivity of a mixed-mode column complementary to that of reversed-phase columns, but it also allows for the development of multiple complementary selectivities on a given column under different appropriate conditions. Mixed-mode chromatography is well-suited to retaining ionic analytes, hydrophobic (e.g., Naproxen) or hydrophilic (e.g., $Na^+$ and $Cl^-$ ions), and requires no ion-pairing agents in the method, significantly improving MS compatibility. This technique has been growing rapidly because of its advantages over conventional chromatography, such as its high resolution, adjustable selectivity, high sample loading, and no need for ion-pairing agents. Many applications involving hydrophilic ionizable compounds that are problematic on a C18 column are easily addressed on a mixed-mode column.

Mixed-mode media can be classified into four general categories. Recently, mixed-modal chromatography which is based on at least two modes of interaction, in most cases ion-exchange and hydrophobic interaction, have become more popular, because it seems that often the achieved resolution outperforms that of corresponding separate individual single-mode chromatographic separations. Such mixed-modal chromatography can be carried out in a number of different variants, which have been reviewed by L. W. McLaughlin (1989) in *Chem. Rev.* 89, pages 309-319:

Category 1 utilized in-line coupling of columns packed with different individual single mode separation materials. For example, a reversed-phase column can be coupled in-line to an ion-exchange column.

Category 2 is based on the use of mixed-bed columns. The columns include a blend of distinct separation materials, such as ion-exchange and reversed-phase particles in a single HPLC column. Blending two types of different materials such as RP particles and anion-exchanger (e.g., strong anion-exchanger particles) in a single column has been used as a method to combine different retention mechanisms, and such columns are commercially available.

Category 3 materials include distinct interactive functionalities such as an ion-exchange moiety and hydrophobic moiety on different components of the separation material. For example, one separation moiety can be located on the dedicated chromatographic ligand and the other on the support. The different interactive moieties are spatially separated.

Category 4 mixed-modal chromatographic materials have the two (or more) distinct interaction sites on a single chromatographic ligand.

Exemplary mixed mode media are based on bonded silica modified by a mixture of both RP and IEX ligands in the bonding step. Although these materials seem straightforward to synthesize, their use in many applications is limited by selectivity drifting. This drift is due mainly to the difference in hydrolytic stability between the RP and IEX ligand bonded sites. Newer mixed-mode media use functional silyl ligands that contain both RP and IEX functionalities to covalently modify silica particles. While the constant ratio between RP and IEX bonded sites greatly improves, a pronounced difference in selectivity exists between the two interaction sites.

Compositions useful in chromatographic separations, as well as methods of making and using these compositions, have been created and are described herein.

SUMMARY OF THE INVENTION

The current invention provides compositions, which are useful as stationary phases for a variety of chromatographic applications, such as liquid chromatography (LC) (e.g., high performance liquid chromatography (HPLC)) and solid phase extraction (SPE). In various embodiments, the invention relates to novel packing materials for liquid chromatography (LC) and related applications. More specifically, it relates to the preparation of novel multimodal anion-exchange (AEX)/cation-exchange (CEX)/hydrophilic interaction (HILIC) multimodal media by coating a hydrophilic charged substrate surface with nano-sized particles of the opposite charge through electrostatic interaction. The resulting media have AEX, CEX and HILIC mixed-mode properties and exhibit unique and desired selectivity for chromatographic separations.

The multimodal compositions of the invention include anion-exchange, cation-exchange hydrophilic interaction (HILIC) capabilities within the same chromatographic material. When choosing appropriate mobile phases, the compositions provide HILIC anion-exchange and cation-exchange capabilities simultaneously. This is made possible because a substantial number of the anion-exchange groups (e.g., basic groups) and a substantial number of the cation-exchange groups (e.g., acidic groups) are physically separated from each other, thereby preventing interactions (e.g., the formation of salt-bridges, neutralization of charge) between them.

In one embodiment, the invention provides a composition comprising a solid support (e.g., inorganic solid support, such as silica gel or silica monolith; or an organic polymeric solid support, such as a polystyrene-divinylbenzene co-polymer) and nanoparticles (e.g., latex particles) bound to the solid support. In various examples, the composition includes cation-exchange groups, anion-exchange groups and HILIC moieties, wherein a substantial proportion (e.g., the majority) of the cation-exchange and the anion-exchange groups are sufficiently spaced from each other to essentially avoid interactions between them. In one example, the HILIC moieties are provided by organic ligands covalently linked to the solid support.

The present invention further provides a composition including a porous solid support (e.g., inorganic solid support, such as silica gel or silica monolith; or an organic polymeric solid support, such as polystyrene-divinylbenzene copolymer) having an exterior surface and interior pores defined by interior walls. The pores extend to openings in the exterior surface. The composition further includes organic ligands covalently bound to the solid support (e.g., via reactive functional groups on the surface of the solid support and/or the ligand). The ligands are bound to the interior walls of the pores and the exterior surface of the support. In various embodiments, the ligands are neutral. In various examples, the ligands include at least one ion-exchange group having a first charge (selected from positive and negative). The composition further includes nanoparticles (e.g., latex particles) that include ion-exchange groups having a second charge (selected from positive and negative), wherein the second charge is opposite to the first charge. The nanoparticles are bound (e.g., irreversibly), either directly or indirectly (e.g., via another layer of nanoparticles), to the exterior surface of the solid support, e.g., via electrostatic forces. In certain embodiments, the average diameter of the nanoparticles is equal to or larger than the average diameter of the pores so that the majority of the nanoparticles are bound to the exterior surface.

The current invention further provides a composition of the invention in a flow-through bed suitable for use as a chromatographic medium. In addition, the invention provides a chromatography column including a composition of the invention. The invention further provides a chromatography column packed with a separation medium including a composition of the invention.

The current invention further provides a method for making a composition of the invention, e.g., for the separation of analytes in a liquid sample. The method includes: (a) providing a porous solid support (e.g., inorganic solid support, such as silica gel or silica monolith; or an organic polymeric solid support, such as polystyrene-divinylbenzene co-polymer) having an exterior surface and interior walls defining interior pores extending to openings in the exterior surface; (b) covalently bonding organic ligands to the interior walls and the exterior surface, for example, via reactive functional groups on the surface of the solid support and/or the ligand. The ligands are uncharged or include at least one ion exchange group having a first charge (selected from positive and negative). The method further includes (c) bonding nanoparticles (e.g., latex particles), directly or indirectly (e.g., via another layer of nanoparticles), to the exterior surface of the solid support (e.g., via electrostatic forces). The nanoparticles include ion exchange groups having a second charge selected from positive and negative. The second charge is preferably opposite to the first charge. In certain embodiments, the average diameter of the nanoparticles is equal to or larger than the average diameter of the pores. In invention further provides a composition made by the above method.

The current invention further provides a chromatographic method (e.g., for separating analytes in a liquid sample) that involves flowing a liquid through a bed (e.g., packed bed or monolith) of a separation medium that includes a composition of the invention. In one example, the liquid (i.e., mobile phase) is a primarily aqueous medium, optionally including an organic solvent.

Also provided are chromatographic devices incorporating the medium of the invention and systems incorporating these devices.

The benefits of the invention(s) described herein include unique selectivity; flexible chemistry and are easily synthesized. Depending on the specific separation requirement, various mixed-mode media can be developed using the approach described herein, such as HILIC/anion-exchange mixed-mode media, HILIC/cation-exchange mixed-mode media, and HILIC/zwitterionic mixed-mode media. Additional embodiments, objects and advantages are apparent in the detailed description that follows.

| Test Probe | Phase 30 | Acclaim Trinity P1 |
|---|---|---|
| k' (meso-erythritol) | 2.12 | 0.53 |
| k' (Tris) | 4.12 | 1.82 |
| k' (glyceric acid) | 37.0 | 4.25 |

Figure 10:
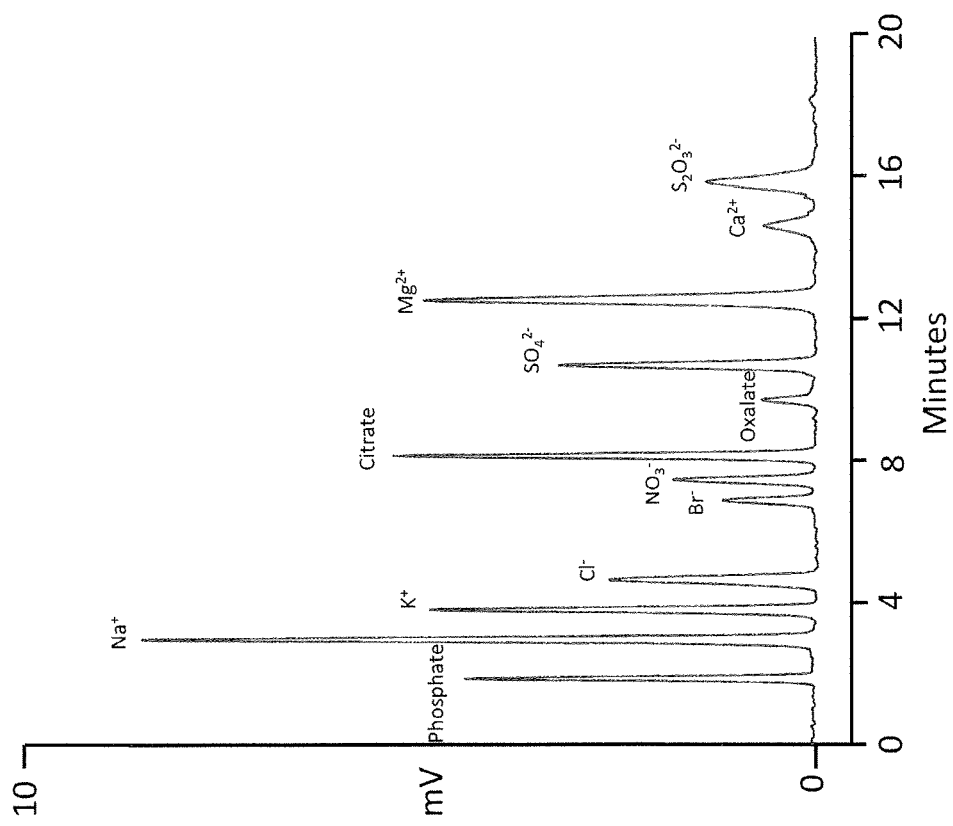

FIG. 10 is a chromatogram showing separation of anions and cations on Phase 30. Column, Phase 30, 3 μm; Dimensions, 3.0×50 mm; Mobile Phase, D.I. water and 100 mM $NH_4OFm$, pH 3.65 gradient; Temperature, 30° C.; Flow Rate, 0.60 mL/min; Inj. Volume, 5 μL; Detection, aerosol based detection (ELSD); Samples, 0.05-0.10 mg/mL each in D.I. water.

Gradient:

| Time (min) | $H_2O$ | 0.1M ammonium formate, pH 3.65 |
|---|---|---|
| −10 | 90 | 10 |
| 0 | 90 | 10 |
| 1 | 90 | 10 |
| 11 | 0 | 100 |
| 20 | 0 | 100 |

Figure 11:
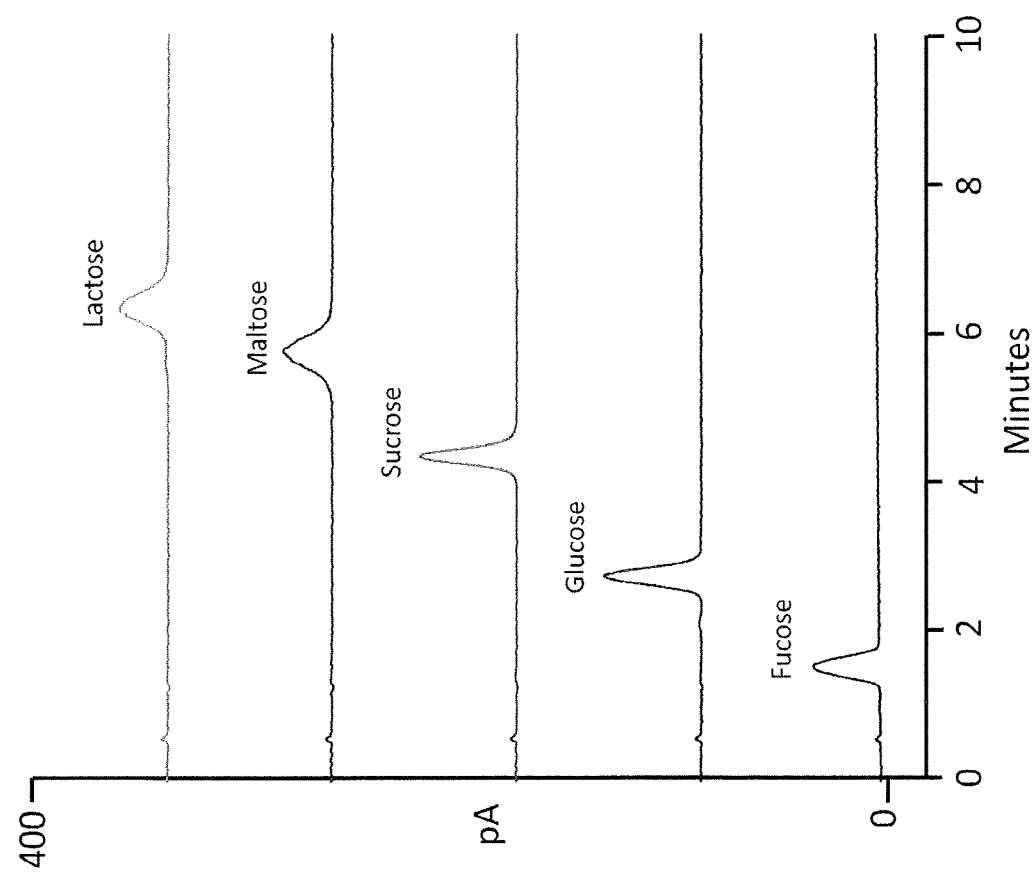

FIG. 11 is a chromatogram showing separation of sugars on Phase 30. Column, Phase 30, 3 μm; Dimensions, 3.0×50 mm; Mobile Phase, MeCN/100 mM $NH_4OFm$, pH 3.65 v/v 80/20; Temperature, 60° C.; Flow Rate, 0.50 mL/min; Inj. Volume, 2 μL; Detection, Charged Aerosol Detection (CAD); Samples, 1 mg/mL each in mobile phase.

Figure 12:
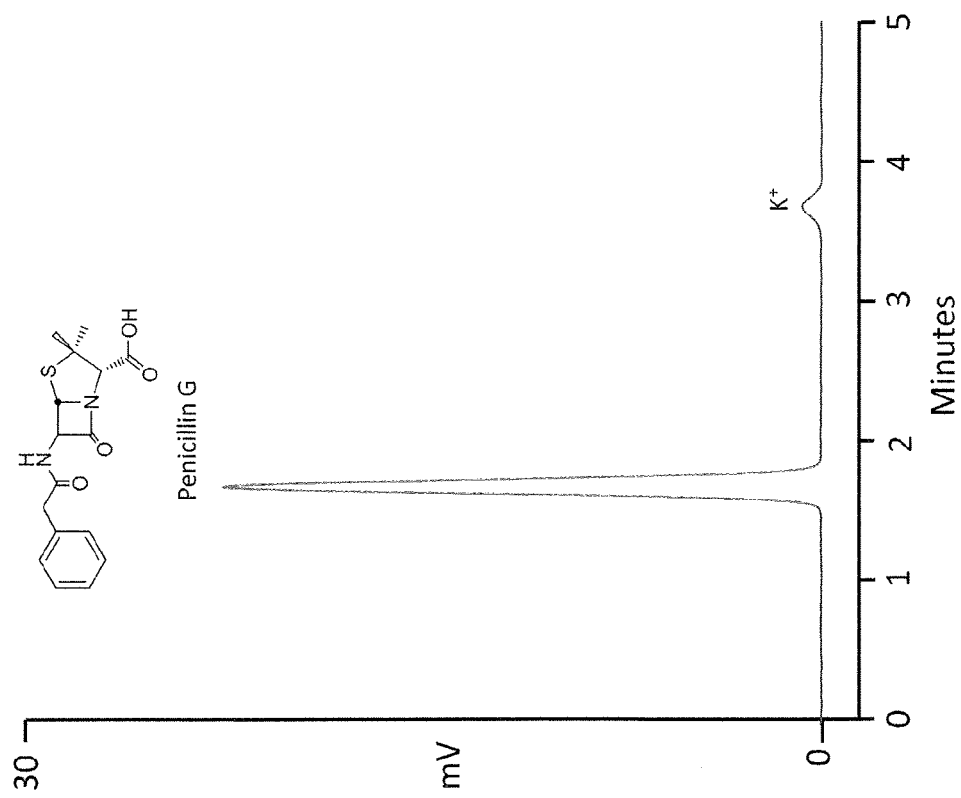

FIG. 12 is a chromatogram showing separation of penicillin G and potassium on Phase 30. Column, Phase 30, 3 μm; Dimensions, 3.0×50 mm; Mobile Phase, MeCN/D.I. water/100 mM $NH_4OFm$, pH 3.65 v/v/v 25/50/25; Temperature, 30° C.; Flow Rate, 0.50 mL/min; Inj. Volume, 1 μL; Detection, aerosol based detection (ELSD); Samples, 1 mg/mL each in mobile phase. Peaks: 1. Penicillin G; 2. Potassium.

Figure 13:
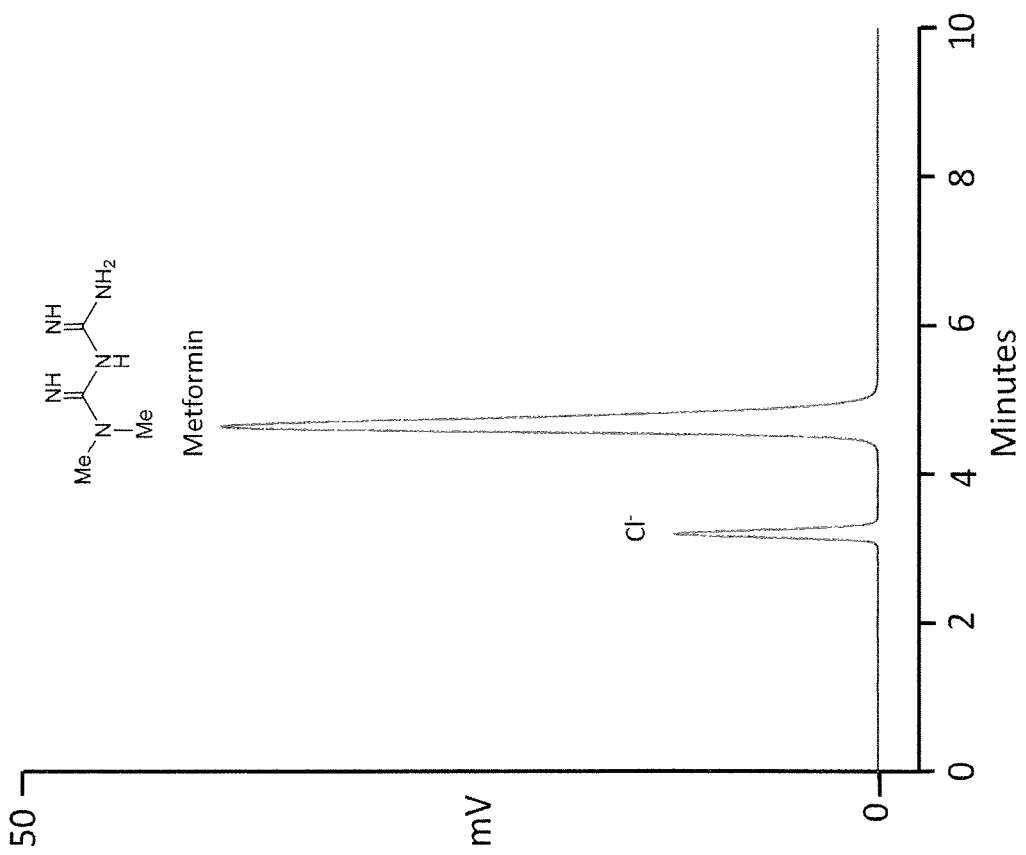

FIG. 13 is a chromatogram showing separation of metformin and chloride on Phase 30. Column, Phase 30, 3 μm; Dimensions, 3.0×50 mm; Mobile Phase, MeCN/100 mM $NH_4OFm$, pH 3.65 v/v 50/50; Temperature, 30° C.; Flow Rate, 0.50 mL/min; Inj. Volume, 1 μL; Detection, Aerosol based detection (ELSD); Samples, 1 mg/mL each in mobile phase. Peaks: 1. Chloride; 2. Metformin.

Figure 14:
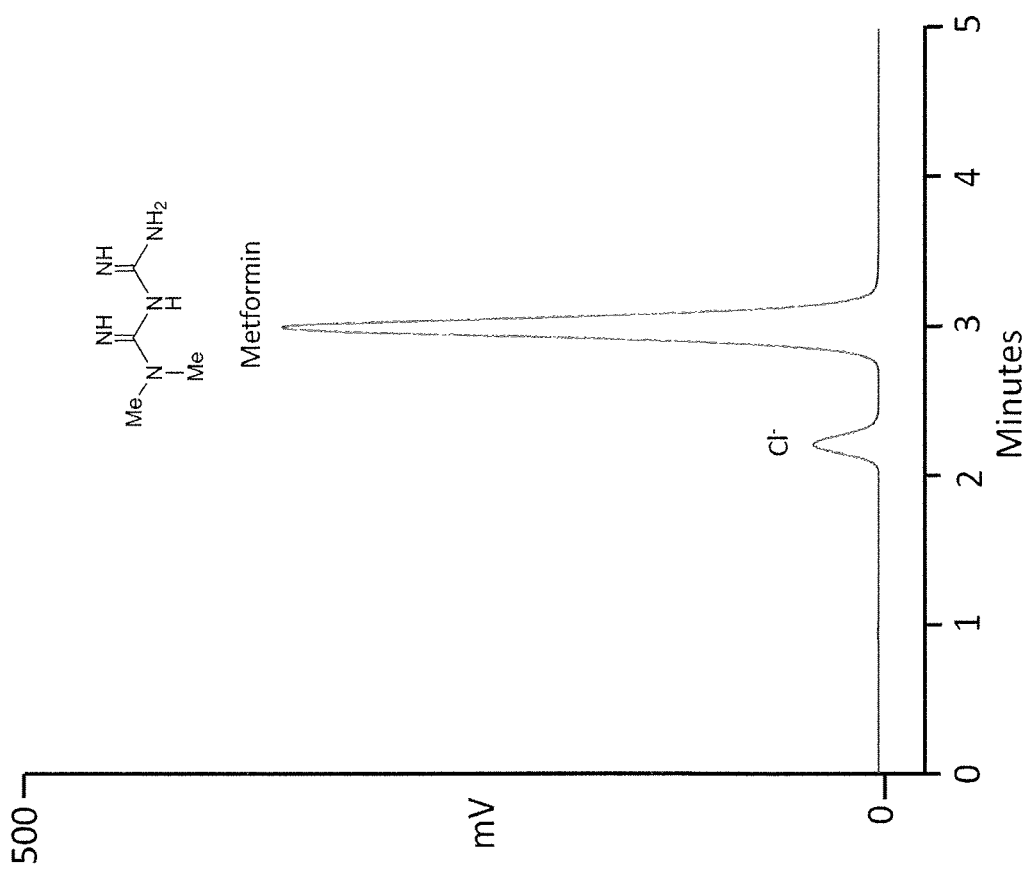

FIG. 14 is a chromatogram showing separation of metformin and chloride on Phase 33. Column, Phase 33, 3 μm; Dimensions, 3.0×50 mm; Mobile Phase, MeCN/100 mM $NH_4OAc$, pH 5.2 v/v 90/10; Temperature, 30° C.; Flow Rate, 0.425 mL/min; Inj. Volume, 1 μL; Detection, aerosol based detection (ELSD); Samples, 1 mg/mL each in mobile phase. Peaks: 1. Chloride; 2. Metformin FIG. 15. Structure of sulfonated silica particles (Phase 21).

FIG. 16. Examples of HILIC/CEX/AEX Multimodal Phases.

Like reference numerals refer to corresponding parts throughout the several views of the drawings.

DETAILED DESCRIPTION OF THE INVENTION

I. Definitions

Where substituent groups are specified by their conventional chemical formulae, written from left to right, they optionally equally encompass the chemically identical substituents, which would result from writing the structure from right to left, e.g., $-CH_2O-$ is intended to also recite $-OCH_2-$.

The term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl (e.g., $-CH_2-CH_2-CH_3$, $-CH_2-CH_2-CH_2-$), isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl." Alkyl groups that are limited to hydrocarbon groups are termed "homoalkyl". The term "alkyl" can also mean "alkylene" or "alkyldiyl" as well as alkylidene in those cases where the alkyl group is a divalent radical.

The term "alkylene" or "alkyldiyl" by itself or as part of another substituent means a divalent radical derived from an alkyl group, as exemplified, but not limited, by $-CH_2CH_2CH_2-$ (propylene or propane-1,3-diyl), and further includes those groups described below as "heteroalkylene." Typically, an alkyl (or alkylene) group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl", "lower alkylene" or "lower alkyldiyl" is a shorter chain alkyl, alkylene or alkyldiyl group, generally having about 10 or fewer carbon atoms, about 8 or fewer carbon atoms, about 6 or fewer carbon atoms or about 4 or fewer carbon atoms.

The term "alkylidene" by itself or as part of another substituent means a divalent radical derived from an alkyl group, as exemplified, but not limited, by $CH_3CH_2CH_2=$(propylidene). Typically, an alkylidene group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl" or "lower alkylidene" is a shorter chain alkyl or alkylidene group, generally having about 10 or fewer carbon atoms, about 8 or fewer carbon atoms, about 6 or fewer carbon atoms or about 4 or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si, S and B, and wherein the nitrogen and sulfur atoms may optionally be oxidized and the nitrogen heteroatom may optionally be quaternized. The heteroatom(s) O, N, B, S and Si may be placed at any interior position of the heteroalkyl group or at the position at which the alkyl group is attached to the remainder of the molecule. Examples include, but are not limited to, $-CH_2-CH_2-O-CH_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH═CH—O—CH$_3$, —Si(CH$_3$)$_3$, —CH$_2$—CH═N—OCH$_3$, and —CH═CH—N(CH$_3$)—CH$_3$. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —CO$_2$R'— represents both —C(O)OR' and —OC(O)R'.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo(C$_1$-C$_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl groups (or rings) that contain from one to four heteroatoms selected from N, O, S, Si and B, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl" and "heteroaryl") are meant to include both substituted and unsubstituted forms of the indicated radical. Exemplary substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: substituted or unsubstituted aryl, substituted or unsubstituted heteroaryl, substituted or unsubstituted heterocycloalkyl, —OR', ═O, ═NR', ═N—OR', —NR'R", —SR', -halogen, —SiR'R"R''', —OC(O)R', —C(O)R', —CO$_2$R', —CONR'R", —OC(O)NR'R", —NR"C(O)R', —NR'—C(O)NR"R''', —NR"C(O)$_2$R', —NR—C(NR'R"R''')═NR"", —NR—C(NR'R")═NR''', —S(O)R', —S(O)$_2$R', —OS(O)$_2$R', —S(O)$_2$NR'R", —NRSO$_2$R', —CN and —NO$_2$ in a number ranging from zero to (2 m'+1), where m' is the total number of carbon atoms in such radical. R', R", R''' and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R''' and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

Similar to the substituents described for the alkyl radical, substituents for the aryl and heteroaryl groups are generically referred to as "aryl group substituents." The substituents are selected from, for example: substituted or unsubstituted alkyl, substituted or unsubstituted aryl, substituted or unsubstituted heteroaryl, substituted or unsubstituted heterocycloalkyl, —OR', ═O, ═NR', ═N—OR', —NR'R", —SR', -halogen, —SiR'R"R''', —OC(O)R', —C(O)R', —CO$_2$R', —CONR'R", —OC(O)NR'R", —NR"C(O)R', —NR'—C(O)NR"R''', —NR"C(O)$_2$R', —NR—C(NR'R"R''')═NR"", —NR—C(NR'R")═NR''', —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro(C$_1$-C$_4$)alkyl, in a number ranging from zero to the total number of open valences on the aromatic ring system; and where R', R", R''' and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R''' and R"" groups when more than one of these groups is present.

Two of the substituents on adjacent atoms of the aryl or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X—(CR"R"')$_d$—, where s and d are independently integers of from 0 to 3, and X is —O—, —NR'—, —S—, —S(O)—, —S(O)$_2$—, or —S(O)$_2$NR'—. The substituents R, R', R" and R"" are preferably independently selected from hydrogen or substituted or unsubstituted (C$_1$-C$_6$)alkyl.

As used herein, the term "silyl group substituent" can be one or more of a variety of groups selected from, but not limited to: substituted or unsubstituted alkyl, substituted or unsubstituted heteroalkyl, substituted or unsubstituted aryl, substituted or unsubstituted heteroaryl, substituted or unsubstituted heterocycloalkyl, acyl, —OR', —NR'R", —SR', -halogen, —SiR'R"R"', —OC(O)R', —C(O)R', —CO$_2$R', —CONR'R", —OC(O)NR'R", —NR"C(O)R', —NR'—C(O) NR"R"', —NR"C(O)$_2$R', —NR—C(NR'R"R"')=NR"", —NR—C(NR'R")=NR"', —S(O)R', —S(O)$_2$R', —OS(O)$_2$ R", —S(O)$_2$NR'R", —NRSO$_2$R', —CN and —NO$_2$. R', R", R"' and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R"' and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

As used herein, the term "non-reactive silyl group substituent" means a "silyl group substituent" that does not react with a substrate of the invention to form a covalent bond between the silyl group substituent and the substrate or, does not behave as a leaving group in a reaction between the ligand (e.g., Formula 1) and the substrate. Exemplary "non-reactive silyl group substituents" include alkyl (e.g., methyl, ethyl, propyl, butyl and other lower alkyl groups) or aryl groups (e.g., phenyl and thiophenyl).

As used herein, the term "reactive silyl group substituent" means a "silyl group substituent" that is capable of reacting with a substrate of the invention to form a covalent bond between the silyl group substituent and the substrate, or which acts as a leaving group in a reaction between the ligand (e.g., 1) and the substrate. Exemplary "reactive silyl group substituents" include those groups that are conventionally defined as leaving groups, such as halogens (e.g., Cl and Br). Other exemplary "reactive silyl group substituents" include alkoxy groups (e.g., methoxy or ethoxy) and primary and secondary amino groups.

As used herein, the term "acyl" describes a substituent containing a carbonyl residue, C(O)R. Exemplary species for R include H, halogen, substituted or unsubstituted alkyl, substituted or unsubstituted heteroalkyl, substituted or unsubstituted aryl, substituted or unsubstituted heteroaryl, and substituted or unsubstituted heterocycloalkyl.

As used herein, the term "fused ring system" means at least two rings, wherein each ring has at least 2 atoms in common with another ring. "Fused ring systems may include aromatic as well as non aromatic rings. Examples of "fused ring systems" are naphthalenes, indoles, quinolines, chromenes and the like.

As used herein, the term "heteroatom" includes oxygen (O), nitrogen (N), sulfur (S), and silicon (Si).

The symbol "R" is a general abbreviation that represents a substituent group that is selected from substituted or unsubstituted alkyl, substituted or unsubstituted heteroalkyl, substituted or unsubstituted aryl, substituted or unsubstituted heteroaryl, and substituted or unsubstituted heterocycloalkyl groups.

When compounds of the present invention contain relatively basic or acidic functionalities, salts of such compounds are included in the scope of the invention. Salts can be obtained by contacting the neutral form of such compounds with a sufficient amount of the desired acid or base, either neat or in a suitable inert solvent. Examples of salts for relative acidic compounds of the invention include sodium, potassium, calcium, ammonium, organic amino, or magnesium salts, or a similar salts. When compounds of the present invention contain relatively basic functionalities, acid addition salts can be obtained by contacting the neutral form of such compounds with a sufficient amount of the desired acid, either neat or in a suitable inert solvent. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived from organic acids like acetic, propionic, isobutyric, maleic, malonic, benzoic, succinic, suberic, fumaric, lactic, mandelic, phthalic, benzenesulfonic, p-tolylsulfonic, citric, tartaric, methanesulfonic, and the like. Also included are salts of amino acids such as arginate and the like, and salts of organic acids like glucuronic or galactunoric acids and the like (see, for example, Berge et al., *Journal of Pharmaceutical Science* 1977, 66: 1-19). Certain specific compounds of the present invention contain both basic and acidic functionalities that allow the compounds to be converted into either base or acid addition salts.

The neutral forms of the compounds are preferably regenerated by contacting the salt with a base or acid and isolating the parent compound in the conventional manner. The parent form of the compound differs from the various salt forms in certain physical properties, such as solubility in polar solvents, but otherwise the salts are equivalent to the parent form of the compound for the purposes of the present invention.

Certain compounds of the present invention can exist in unsolvated forms as well as solvated forms, including hydrated forms. In general, the solvated forms are equivalent to unsolvated forms and are encompassed within the scope of the present invention. Certain compounds of the present invention may exist in multiple crystalline or amorphous forms. In general, all physical forms are equivalent for the uses contemplated by the present invention and are intended to be within the scope of the present invention. "Compound or a pharmaceutically acceptable salt or solvate of a compound"

intends the inclusive meaning of "or", in that a material that is both a salt and a solvate is encompassed.

Certain compounds of the present invention possess asymmetric carbon atoms (optical centers) or double bonds; the racemates, diastereomers, geometric isomers and individual isomers are encompassed within the scope of the present invention. Optically active (R)- and (S)-isomers may be prepared using chiral synthons or chiral reagents, or resolved using conventional techniques. When the compounds described herein contain olefinic double bonds or other centers of geometric asymmetry, and unless specified otherwise, it is intended that the compounds include both E and Z geometric isomers. Likewise, all tautomeric forms are also intended to be included.

The graphic representations of racemic, ambiscalemic and scalemic or enantiomerically pure compounds used herein are taken from Maehr, *J. Chem. Ed.*, 62: 114-120 (1985): solid and broken wedges are used to denote the absolute configuration of a chiral element; wavy lines indicate disavowal of any stereochemical implication which the bond it represents could generate; solid and broken bold lines are geometric descriptors indicating the relative configuration shown but not implying any absolute stereochemistry; and wedge outlines and dotted or broken lines denote enantiomerically pure compounds of indeterminate absolute configuration.

The compounds of the present invention may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I) or carbon-14 ($^{14}$C). All isotopic variations of the compounds of the present invention, whether radioactive or not, are intended to be encompassed within the scope of the present invention.

The terms "average diameter of the particle", "particle size", "average particle size", "median particle size", or any grammatical variation thereof refers to the particle size specification for a substrate (solid-support) of the invention. Particle-sizes are typically provided by the manufacturer. Particle sizes can refer to any type of particle including spherical and irregular-shaped particles.

"Mobile phase" and "eluent" are used interchangeably referring to a liquid that moves dissolved components (e.g., a glycan) of a mixture that is to be separated through a chromatographic column or other separation device. The mobile phase often contains more than one compound and is a mixture of different solvents or a solution of salts, acids, bases, etc.

"Solvent" is a liquid organic compound (e.g., a single compound). An exemplary solvent is at least partially water miscible. In various embodiments, a solvent is fully water miscible. In various embodiments, "solvent" refers to acetonitrile.

As used herein, the terms "having a charge", "charged", "positively charged", "negatively charged" and any grammatical variation thereof, in connection with the substrates and nanoparticles of the invention, indicate that the material includes ion-exchange groups. As described above, ion-exchange groups can be either ionic or ionizable in nature. Hence, the term "charged" or "having a charge" can mean incorporating "ionic" or "ionizable" groups.

The terms "substrate" and "support" or "solid support" are used interchangeably.

The term "essentially retained" refers to an analyte (e.g., an ion, an ionizable compound, an uncharged molecule and the like) and means that the analyte elutes from the separation medium after the void volume, e.g., giving rise to a peak with baseline separation from the solvent peak.

"—COOH" is meant to optionally include —C(O)O$^-$ and —C(O)O$^-$X$^+$, wherein X$^+$ is a cationic counter-ion. Likewise, a substituent having the formula —N(R)(R) is meant to optionally include —N$^+$H(R)(R) and —N$^+$H(R)(R)Y$^-$, wherein Y$^-$ represents an anionic counter-ion. Exemplary phases of the invention include a protonated carboxylic moiety (COOH) as a hydrophilic moiety for HILIC. Exemplary phases of the invention include a deprotonated carboxylic moiety (COO$^-$) as an ion exchange moiety. Various phases of the invention include both a protonated carboxylic moiety and a deprotonated carboxylic moiety, wherein the former serves as a HILIC moiety and the latter as an ion exchange moiety. In an exemplary embodiment, under HPLC-relevant pH conditions, only one of two or more carboxylic moieties is deprotonated.

The terms "average diameter of the pore", "average diameter of the pore opening" or any grammatical variation thereof, refer to the pore size specification of a substrate. Pore sizes are typically provided by the manufacturer of a chromatographic material (e.g., silica gels). Pore sizes can, for example, be determined using microscopy or porosimetry.

The terms "average diameter of the particle", "particle size", "average particle size", "median particle size", or any grammatical variation thereof refers to the particle size specification for a substrate (solid-support) of the invention. Particle-sizes are typically provided by the manufacturer. Particle sizes can refer to any type of particle including spherical and irregular-shaped particles.

II. Introduction

The current invention provides compositions with unique and desired chromatographic properties, which are useful as stationary phases for a variety of chromatographic applications, such as high performance liquid chromatography (HPLC) and solid-phase extraction (SPE). In certain embodiments, the compositions of the invention include HILIC, anion-exchange and cation-exchange capabilities within the same chromatographic material. In these compositions, the anion-exchange groups (e.g., basic groups) and cation-exchange groups (e.g., acidic groups) are physically removed (i.e., spatially separated) from each other in order to minimize or prevent interactions (e.g., formation of salt-bridges, electrostatic interaction, charge-neutralization) between them. In one example, the spatial separation of anion-exchange and cation-exchange groups is accomplished by providing one type of ion-exchange groups within pores or on the exterior surface of a porous support, while the other type of ion-exchange group is provided on nanoparticles (e.g., latex particles), which are bound (e.g., irreversibly) to the outer surface of the solid support.

The compositions provide unique selectivity. For example, the compositions can be used to retain and separate cationic, anionic and neutral molecules within a single analysis (see FIG. 6-8). The compositions can be used to chromatograph (e.g., retain) ionic or ionizable compounds without the use of ion-pairing reagents. The selectivity of the current compositions can be adjusted by changing the chemical composition of the mobile phase. Properties of the mobile phase which can be used to modify the selectivities of the stationary phase include ionic strength, pH and additives, such as organic solvents. The compositions are compatible with highly aqueous conditions (e.g., resistant to de-wetting in 100% aqueous conditions) as well as highly organic solvent conditions. The compositions are characterized by a multi-mode retention mechanism, which may include anion-exchange, cation-exchange, reversed-phase, ion-exclusion, and HILIC. The compositions are useful not only for making analytical separation columns, but also for developing new solid phase extraction (SPE) applications. The compositions can be blended with other chromatographic packing materials to produce a variety of novel packing materials for both separation and SPE columns. The compositions can be prepared in a versatile, facile and economic manner. The ratio of cation-exchange, anion-exchange and hydrophilic interaction can be synthetically adjusted by using base solid supports with different surface area and particle size, different latex chemistry and particle sizes, and/or different surface chemistry that forms the charged layer on the solid support.

III. Compositions

In an exemplary embodiment, the invention provides an agglomerated multimodal chromatographic medium with hydrophilic interaction, cation exchange and anion exchange properties. The medium is suitable for use as chromatographic packing. An exemplary medium comprises (a) component A comprising substrate particles functionalized with a ligand with a charged ion exchange group of one charge, positive or negative, bound to the substrate particles, and a hydrophilic ligand comprising an uncharged polar group; and (b) component B comprising particles of a second substrate having charged external surfaces of opposite charge to that of the charged ion exchange ligand. Component A and component B are bound by electrostatic forces between the charged ion exchange ligand of component A and the charged external surfaces component B forming, in composite, an agglomerated medium of ion exchange particles.

In an exemplary embodiment, the ligand of component A is a negatively charged ligand, and the ligand of Component B is a positively charged ligand.

In various embodiments, the hydrophilic ligand includes at least one uncharged polar group internal to the ligand structure or at a terminus of the ligand (e.g., ROR', ROH, respectively), and not more than five non-aromatic carbons in series (e.g., fewer than 6, fewer than 5, fewer than 4, fewer than 3, or 1 carbon atom). In various embodiments, the ligand includes not more than five alkylene carbons in series (e.g., fewer than 6, fewer than 5, fewer than 4, fewer than 3, or 1 carbon atom). In various embodiments, the alkylene carbons are methylene carbons. In an exemplary embodiment, the ligand includes a phenyl moiety with two or more carboxylic acid substituents.

In various embodiments, the polar group is capable of assuming a charge but does not do so because of the pH conditions relevant to the HPLC analyses in which the invention finds an exemplary use. In various embodiments, the hydrophilic ligand does not include an amino-alcohol. In various embodiments, the invention includes an amino-alcohol which is other than an aminodiol. In various embodiments, the invention includes an aminodiol which is other than $-N((CH_2OH)_n)_2$, in which n is an integer from 1 to 3.

In various embodiments, the ion exchange chromatographic moiety is a group that is other than the HILIC chromatographic moiety. In various embodiments, the HILIC chromatographic moiety is not charged under HPLC-relevant pH conditions. In various embodiments, the HILIC chromatographic moiety and the ion exchange moiety are on the same ligand, however, the two moieties are different moieties. In an exemplary embodiment, the HILIC moiety is a protonated carboxylic group (COOH) and the ion exchange moiety is an unprotonated carboxylic group ($COO^-$) and these two groups are located on the same ligand.

In one embodiment, the compositions according to the invention include a porous solid support (e.g., silica gels, silica monoliths or synthetic organic resins) having an exterior surface and pore openings defined by "interior walls" with an interior diameter defining the pore size. The pores open to the exterior surface of the substrate. The solid support includes ion exchange groups, which can be positively or negatively charged groups. In one example, the ion-exchange groups are provided by the support itself, e.g., by incorporation of charged monomers into a synthetic resin polymer or by ionizable silanol groups on the surface of a silica substrate. In another example, the solid support (e.g., silica gel, silica monoliths) is covalently modified (e.g., alongside the interior pore walls and optionally the exterior surface) with organic ion-exchange ligands (e.g., silyl ligands). The ligands incorporate at least one ion-exchange group (e.g., ionic or ionizable group). The ionic nature of the ligand can be positive or negative. In another embodiment, the HILIC ligand is neutral.

Exemplary ligands include basic and/or acidic ion-exchange groups. Exemplary ion-exchange groups include anion-exchange groups, such as amino groups (e.g., primary, secondary, tertiary or quaternary amines) or cation-exchange groups, such as carboxylic acid or sulfonic acid groups. In one example, the ligand includes both anion-exchange and cation-exchange groups (i.e., zwitterionic or amphoteric ligands). The ligands include additional polar groups (e.g., ether, amide, alcohol, sulfonamide, urea or protonated carboxylic acid groups). The ligands can also include hydrophilic moieties (e.g., urea or carboxylic acid, e.g., protonated carboxylic acid). In one example, such hydrophilic moieties provide sufficient hydrophilicity to impart HILIC characteristics to the stationary phase in addition to the ion-exchange characteristics.

In various embodiments, the ion exchange ligand of component A and the hydrophilic ligand of component A are the same ligand (i.e., a single ligand includes both ion exchange and HILIC chromatographic moieties). In this embodiment, the ligand includes one or more non-charged polar groups in addition to one or more charged ion exchange groups. In various embodiments, the ion exchange ligand of component A and the hydrophilic ligand of component A are different ligands independently attached to component A.

In an exemplary embodiment, a member selected from the ion exchange ligand, the hydrophilic ligand and a combination thereof is covalently bound to said substrate through one or more Si—O—Si or Si—O bond.

In an exemplary embodiment, at least one of the ion exchange ligand, the hydrophilic ligand and a combination thereof has the formula:

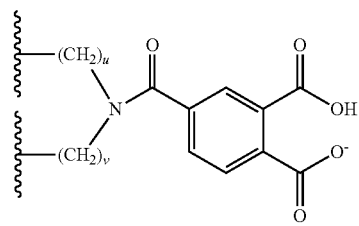

in which u and v are integers independently selected from the integers 1, 2, 3, 4, 5, 6, 7, 8, 9, and 10.

In an exemplary embodiment, this ligand has the formula:

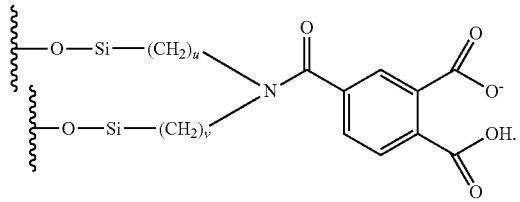

As will be appreciated by those of skill, the Si atoms of this ligand are substituted with one or more oxygen atom bound to the substrate or OH moiety sufficient to satisfy the valency of Si.

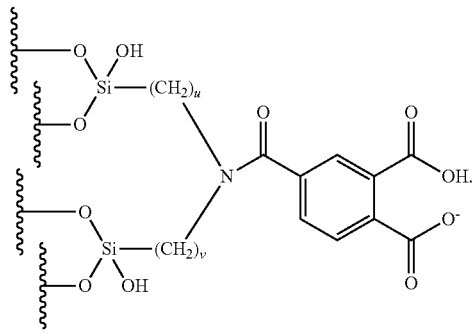

In various embodiments, component A is functionalized with a ligand which is a member selected from:

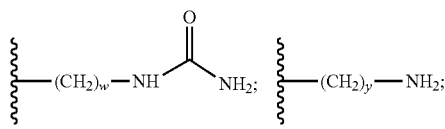

and a combination thereof, in which w and y are integers independently selected from 1, 2, 3, 4, 5, 6, 7, 8, 9 and 10.

In an exemplary embodiment, the ligands have the formulae:

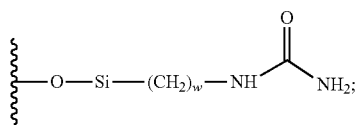

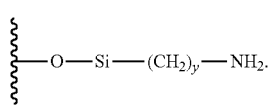

As shown herein, the silicon atoms in these ligands are bound to one or more moiety selected from an oxygen atom of the substrate and a hydroxyl moiety sufficient to satisfy the valency of Si. For example:

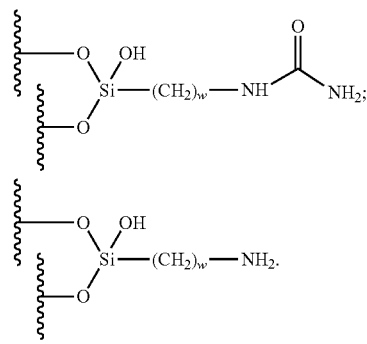

In an exemplary embodiment, component A ligands are polymerized onto said component A substrate particles. In various embodiments, ligands are polymerized in situ onto said component A substrate particles. In an exemplary embodiment, the component A ligand is a polymeric ligand and the particles of component B are entangled in the polymeric ligand.

In an exemplary embodiment, a PS-DVB substrate is functionalized with cation-exchange ligands incorporating carboxylic acid and/or sulfonic acid groups resulting in a PS-DVB cation-exchange substrate. To the exterior surface of the PS-DVB cation-exchange substrate are bound latex particles incorporating primary, secondary, tertiary or quaternary amino groups. An exemplary composition according to this embodiment is listed in FIG. 16. A person of ordinary skill in the art will appreciate that the exemplary carboxylic acid- or sulfonic acid-bearing ligands/substrates of the compositions in the table of FIG. 16 can be substituted by any other carboxylic acid- or sulfonic acid-bearing ligand/substrate, such as those described herein and incorporated herein by reference.

The compositions further include nanoparticles, such as latex-based nanoparticles, which are bound to the exterior surface of the above described ion-exchange substrate. For example, the nanoparticles can be attached to the surface of the substrate via electrostatic forces (e.g., between a positively charged support and a negatively charged nanoparticle). The nanoparticles incorporate ion-exchange groups having a charge that is opposite to the charge found on the support. Exemplary nanoparticles are functionalized with amino groups or sulfonic acid groups. In another example, the net-surface charge of the substrate is opposite to the net-surface charge of the nanoparticles thereby providing a chromatographic material including both anion-exchange and cation-exchange sites, wherein the anion-exchange and cation-exchange sites are physically/spatially separated from each other.

In an exemplary embodiment, component B charged external surfaces comprise a member selected from a sulfonate, a carboxylate, a phosphate and a charged amine.

Figure 1:
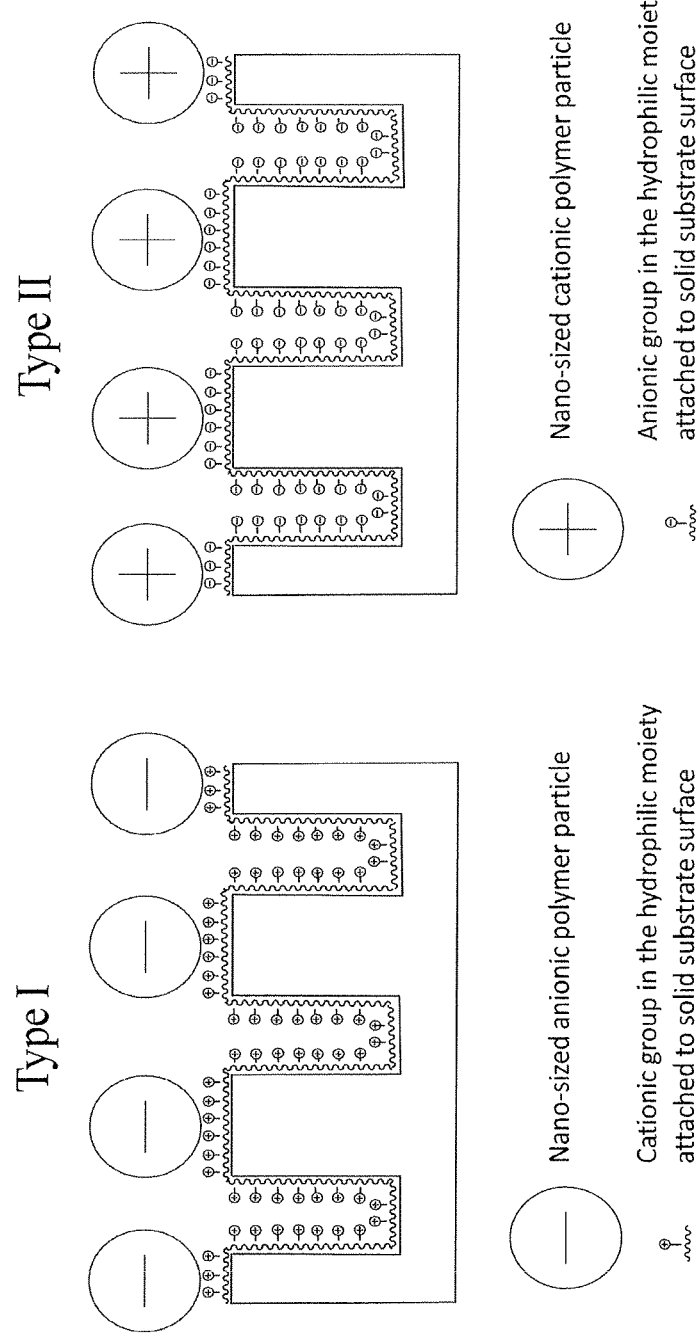
FIG. 1. General structures of HILIC/cation-exchange/anion-exchange multimodal phases. Solid Substrate=$SiO_2$, $TiO_2$, $Al_2O_3$, $ZrO_2$, or polymer; totally porous, superficially porous, or non-porous; particulate or monolithic. Charged Functional Layer=covalently bonded layer from single type of silyl ligand; covalently bonded layer from a mixture of two or more types of silyl ligand; multi-step covalently bonded layer from multi-step transformation; functional layer by polymer encapsulation. Nano-sized charged polymer particles=WAX (primary, secondary or tertiary amino group), SAX (quaternary amino group), WCX (carboxylic group) or SCX (sulfonic group); any type of organic polymer substrates, including PS-DVB based, polymethacrylate based, and DVB-methacrylate co-polymer; particle size: 30-1,000 nm.

In one example, the nanoparticles have a size that is sufficient to minimize the number of particles that can enter the pores of the support thereby reducing or essentially preventing binding of the nanoparticles to the interior walls of the pores. The nanoparticles are ideally bound to the outer surface of the substrate (externally bound) as illustrated in FIG. 1. Hence, in a preferred embodiment, the nanoparticles have an average diameter equal to or larger than the average diameter of the pore openings. For example, while the pores have an average diameter of less than about 30 nm, the average diameter of the nanoparticles is greater than about 50 nm.

Hence, the interior walls of the pores remain intact upon binding of the nanoparticles and retain their original functionalities and properties. By physically separating the ion-exchange groups located within the pores and the ion-exchange groups located at the surface of the nanoparticles, the current compositions can provide both anion-exchange and cation-exchange capabilities simultaneously within the same stationary phase. The spatial separation of different ion-exchange groups in this manner prevents interactions (e.g., formation of salt-bridges) between the oppositely charged groups.

For example, the surface of the substrate (exterior surface and interior walls of pores) is derivatized with an organic ligand having anion-exchange (positively charged) sites. To the exterior surface are bound nanoparticles that provide cation-exchange (negatively charged) sites. The nanoparticles "block" the positively charged sites on the exterior surface of the substrate "replacing" them with the negatively charged sites on the surface of the nanoparticles. However, because the nanoparticles are too big to enter the pores, the interior walls of the pores continue to provide positively charged sites. The resulting composition provides anion-exchange sites in the interior of the pores and cation-exchange sites on the surface of the nanoparticles, both separated from each other. A person of skill in the art will appreciate that the above strategy can be used to create a composition with cation-exchange sites within the pores and anion-exchange sites on the surface of the nanoparticles.

While the pores are essentially too small for the nanoparticles to penetrate, the pores can still be accessed by the analytes, which are present in a chromatographic sample. A liquid sample, containing one or more analytes can enter the pores and inside the pores, the analytes can interact with the ion-exchange ligands bound to the solid support. Thus, analytes within a liquid sample can interact with both the ion-exchange sites provided by the ligands within the pores and the ion-exchange sites provided by the nanoparticles. In an exemplary embodiment, the diameter of the pores of component A substrate is less than or equal to about 30 nm and the diameter of the particles of second substrate is greater than or equal to about 50 nm.

By physically separating the ion-exchange groups located within the pores and the ion-exchange groups located at the surface of the nanoparticles, the current compositions provide both anion-exchange and cation-exchange capabilities simultaneously within the same stationary phase. For example, the pH and composition of the mobile phase, which is used for a chromatographic separation, are selected so that both the anion-exchange groups and the cation-exchange groups are charged (e.g., at approximately neutral pH) and are thus both available for ionic interaction with an analyte. Alternatively, the mobile phase can be selected so that either the anion-exchange or the cation-exchange capability is dominating (i.e., the net-charge of the resin is positive or negative). Typically, such conditions will involve below or above neutral pH of the mobile phase, respectively.

The simultaneous presence of HILIC anion-exchange and cation-exchange groups that can be selectively utilized (e.g., "switched" on or off; "dialed" in or out) by choosing appropriate mobile phases, provides chromatographic stationary phases with unique and desired properties. For example, the novel stationary phases can be used to simultaneously analyze anions and cations, each of which can be inorganic or organic. Because the novel stationary phases can be used as anion-exchange resins, cation-exchange resins supports for HILIC or hybrids thereof, they provide exceptional chromatographic versatility.

In addition, when the porous solid support is modified with ligands incorporating hydrophilic moieties (e.g., providing HILIC characteristics), the resulting composition can combine anion-exchange, cation-exchange and HILIC functionalities (i.e., multimodal phases). Such compositions are useful to analyze anions, cations and hydrophilic molecules simultaneously. In one example, a ligand with HILIC functionality incorporates a hydrophilic moiety (e.g., carbon chain with five or fewer carbon atoms in sequence).

In one example, additional layers of nanoparticles can be attached to the above first layer of nanoparticles (e.g., via electro-static attachment). Hence, the outer layer of nanoparticles providing the desired ion-exchange characteristics may be attached to the solid support indirectly via one or more additional layers of nanoparticles. In one example, a first layer of positively charged latex-particles is attached to the outer surface of the substrate. Onto the first layer of latex-particles is then added a second layer of nanoparticles that are negatively charged. In another example, a first layer of negatively charged latex-particles is attached to the outer surface of the substrate. Onto the first layer is then added a second layer of nanoparticles that are positively charged. Third layers (and subsequent layers) of nanoparticles can be added accordingly (e.g., each with an opposite charge to the previous layer).

The benefits of exemplary stationary phases provided by this invention include:

The present invention provides a composition including: (a) a porous solid support. The porous solid support has an exterior surface and interior pores defined by interior walls. The pores extend to openings in the exterior surface. The composition further includes (b) organic ligands (e.g., neutral or ion-exchange ligands) covalently bound to the solid support including the interior walls of the pores. In various examples, the ligands include ion-exchange groups optionally having a first charge (selected from positive and negative). The composition further includes (c) nanoparticles (e.g., latex particles) including ion-exchange groups optionally having a second charge (selected from positive or negative), wherein the second charge is opposite to the first charge. The nanoparticles are bound (e.g., via electrostatic attraction), either directly (see e.g., U.S. Pat. No. 4,927,539 to Stevens et al., U.S. Pat. No. 4,351,909 to Stevens et al., U.S. Pat. No. 4,519,905 to Stevens et al., U.S. Pat. No. 4,383,047 and U.S. Pat. No. 5,532,279 to Barretto et al., each incorporated herein by reference) or indirectly (e.g., via additional layers of nanoparticles, or a dispersant, see e.g., U.S. Pat. No. 5,532,279 to Baretto et al., incorporated herein by reference), to the exterior surface of the solid support.

In one example, the nanoparticles are bound to the exterior surface in a manner allowing liquid flow into the interior pores of the solid support. In various embodiments, the average diameter of the nanoparticles is equal to or larger than the average diameter of the pore openings. Because the pore openings are generally smaller than the nanoparticles, only areas outside of the pores are typically coated with the nanoparticles (e.g., latex-particles). A person of skill in the art will appreciate that pore sizes can vary significantly below and above an average pore size and will therefore understand that the material can contain a number of pores with nanoparticles bound to the interior walls. However, by choosing a suitable ratio between pore size and nanoparticle size, the number of pores containing nanoparticles can be adjusted to create a composition with optimized functionalities. A small percentage of pores with interior nanoparticles may even be desirable. Hence, the current invention encompasses compositions, in which a small number of nanoparticles have penetrated the pore openings, as long as the majority (e.g., at least about 60%, at least about 70%, at least about 80%, at least about 90%, at least about 95%, at least about 98% or at least about 99%) of the nanoparticles are bound to the exterior surface of the solid support.

Further exemplary solid supports, organic ligands and nanoparticles that are useful in the compositions and methods of the invention are described herein below.

A. Solid Support

The solid support (substrate) of the current invention can be any solid material that is either non-porous or characterized by having pores (e.g., those useful as a stationary phase/packing material for chromatography). In one example, the solid support includes inorganic (e.g., silica) material. In another example, the solid support includes organic (e.g., polymeric) material (e.g., synthetic resins). In yet another example, the solid support includes a hybrid inorganic-organic material. The substrate is preferably insoluble in the solvent system used for the respective separation.

In one embodiment, the solid support includes metal oxides or metalloid oxides. Exemplary substrates include silica-based (e.g., silicon oxide, $SiO_2$), titania-based (e.g., titanium oxide, $TiO_2$), germanium-based (e.g., germanium oxide), zirconia-based (e.g., zirconium oxide, $ZrO_2$), alumina-based (e.g., aluminum oxide, $Al_2O_3$) materials or mixtures thereof. Other substrates include cross-linked and non-crosslinked polymers, carbonized materials and metals. Substrates can also incorporate polymeric networks, sol-gel networks or hybrid forms thereof. In one embodiment, the substrate is a silica-based substrate. Exemplary silica-based substrates include silica gel, glass, sol-gels, polymer/sol-gel hybrids and silica monolithic materials.

Exemplary synthetic resins useful as the organic substrate in the current invention are described in U.S. Pat. No. 4,927,539 to Stevens et al., U.S. Pat. No. 4,351,909 to Stevens et al., U.S. Pat. No. 4,519,905 to Stevens et al., U.S. Pat. No. 4,383,047 and U.S. Pat. No. 5,532,279 to Barretto et al., the disclosures of which are each incorporated herein by reference for all purposes.

The solid support may be formed from any synthetic resin material. Exemplary synthetic polymer ion-exchange resins include poly(phenol-formaldehyde), poly(acrylic acid), poly(methacrylic acid), polynitriles, amine-epichlorohydrin copolymers, graft polymers of styrene on polyethylene or polypropylene, poly(2-chloromethyl-1,3-butadiene), poly(vinylaromatic) resins such as those derived from styrene, alpha-methylstyrene, chlorostyrene, chloromethylstyrene, vinyltoluene, vinylnaphthalene or vinylpyridine, corresponding esters of acrylic acid and methacrylic acid, and similar unsaturated monomers, mono-vinylidene monomers including the monovinylidine ring-containing nitrogen heterocyclic compounds, and any copolymers of the above resins. Additional examples include glycidyl acrylate-based and glycidyl methacrylate-based materials (e.g., 2-glycidyloxyethyl methacrylate, vinylbenzyl glycidyl ether, 2-(4-vinylbenzyloxy) ethyl glycidyl ether) as well as those derived from vinylbenzyl chlorides, vinylbenzyl alcohols, 2-(4-vinylbenzyloxy) ethanol, polyacrylamides, polyvinylalcohols, polyvinylformamides.

Any of the above materials can optionally be co-polymerized with monomers incorporating ionic or ionizable (and optionally reverse-phase) functionalities. Any of the above materials can optionally be functionalized with a suitable ligand incorporating ionic or ionizable and optionally reverse-phase functionalities.

In one embodiment, the support comprises cross-linked polymers or copolymers. An exemplary copolymer is styrene-divinylbenzene copolymer (e.g., PS-DVB). In one example, the styrene-divinylbenzene copolymer contains between about 0% to about 100% divinylbenzene monomer by weight. In another example, the styrene-divinylbenzene copolymer contains between about 25% to about 80% divinylbenzene monomer by weight. The copolymer can be prepared, for example, according to the method of Ikada et al., *Journal of Polymer Science, Vol.* 12, 1829-1839 (1974) or as described in U.S. Pat. No. 4,382,124 to Meitzner, et al.

In one example, the solid support includes a silica-, alumina-, zirconia- or titania-polymeric resin hybrid material. Exemplary silica-organic hybrids are described in U.S. Pat. No. 6,528,167 and U.S. Patent Application Publication 2006/0070937 (application Ser. No. 11/240,695), the disclosures of which are incorporated herein by reference for all purposes.

In one example, the solid support of the present invention is formed by well known suspension polymerization techniques. In this example, the particles are typically derived from a monomer mixture, which is insoluble in the solvents with which they will be contacted. Exemplary substrates are formed by heating and stirring a suspension of monomers in a suitable solvent in the presence of a suitable emulsifying agent. Alternatively, the polymerization may be carried out by a suspension, bulk or solution process followed by grinding the resin to a desired size by mechanical means (e.g., ball mills, rod mills or the like).

The solid support can be of any form, including particulates (e.g., spherical, essentially spherical; e.g., resin beads), chips, chunks, blocks, monoliths and the like. When the substrate is in particulate form, the particles (e.g., irregular-shaped or bead-shaped, e.g., essentially spherical) have a median particle size (i.e., diameter). In one example, the median particle size of the substrate (e.g., spherical silica gel) is between about 0.1 (e.g., silica nanospheres) and about 10,000 µm (microns). In one example, the median particle size of the substrate is between about 1 and about 5000 microns, between about 1 and about 1000 microns, between about 1 and about 500 microns, between about 1 and about 400 microns, between about 1 and about 300 microns, between about 1 and about 200 microns or between about 1 and about 100 microns. In yet another example, the median particle size of the substrate is between about 1 and about 80 microns, between about 1 and about 70 microns, between about 1 and about 60 microns, between about 1 and about 50 microns, between about 1 and about 40 microns, between about 1 and about 30 microns, between about 1 and about 20 microns or between about 1 and about 10 microns. In other example, the median particle size of the substrate particles is between about 10 and about 100 microns, between about 10 and about 80 microns, between about 40 and about 200 microns, between about 40 and about 100 microns, between about 40 and about 80 microns, between about 60 and about 200 microns, between about 60 and about 100 microns, between about 70 and about 200 microns, between about 80 and about 200 microns, between about 100 and about 200 microns, between about 200 and about 600 microns, between about 200 and about 500 microns or between about 200 and about 400 microns. In a particular example, the substrate is silica-based (e.g., silica gel) having a median particle size of between about 40 and 80 microns. The particle size can also be measured in "mesh" as defined on the Tyler Equivalent scale (the smaller the particle, the higher the mesh number). Typical mesh characteristics range between about 10 and 600. Generally, substrate particles useful in any packed bed chromatographic application (e.g., LC, HPLC or ultra-pressure chromatography) are suitable for use in the compositions of the invention.

In various examples, the support is in particulate form, and multiple support particles are disposed in a packed bed. For example, a plastic or metal column is packed with the support particles.

In other examples, the substrate particles are essentially "monodisperse" or essentially "homodisperse", which indicates that the particle size of the majority of the particles (e.g., 80, 90 or 95% of the particles) does not vary substantially (e.g., not more than 50%) below or above the median particle size (M). In an exemplary monodisperse substrate particle population, 90% of the particles have an average particle size of between about 0.5×M and about 1.5×M.

In another example, the substrate is an inorganic or organic monolith. In one example the solid support includes a silica monolith. In another example, the solid support includes an alumina monolith. In yet another example, the solid support includes a zirconia monolith. In a further example, the solid support includes a titania monolith. Exemplary monolithic materials based on organic compositions and methods of preparing such materials are described in U.S. Pat. Nos. 5,130,343; 5,929,214; 5,728,457; 5,260,094; 6,887,384; 5,334,310; 7,303,671; 5,453,185 and 7,074,331, the disclosures of which are incorporated herein by reference in their entireties for all purposes.

The pores of the substrate can have any size. In a typical substrate, the average pore size is equal to or smaller than the nanoparticles, described herein below. The nominal pore size is typically measured in angstroms ($10^{-10}$ m, Å). In one example, the average diameter of the substrate pores is between about 1 and about 5000 Å. In another example, the volume average diameter of the substrate pores is between about 10 and about 5000 Å, between about 10 and about 4000 Å, between about 10 and about 3000 Å, between about 10 and about 2000 Å, between about 10 and about 1000 Å, between about 10 and about 800 Å, between about 10 and about 600 Å, between about 10 and about 400 Å, between about 10 and about 200 Å, between about 10 and about 100 Å, between about 20 and about 200 Å, between about 20 and about 100 Å, between about 30 and about 200 Å, between about 30 and about 100 Å, between about 40 and about 200 Å, between about 40 and about 100 Å, between about 50 and about 200 Å, between about 50 and about 100 Å, between about 60 and about 200 Å, between about 60 and about 100 Å, between about 70 and about 200 Å, between about 70 and about 100 Å, between about 80 and about 200 Å, between about 100 and about 200 Å, between about 100 and about 300 Å, between about 100 and about 400 Å, between about 100 and about 500 Å, between about 200 and about 500 Å or between about 200 and about 600 Å.

The specific surface area of the substrate is typically between about 0.1 and about 2,000 m$^2$/g. For example, the specific surface area of the substrate is between about 1 and about 1,000 m$^2$/g, between about 1 and about 800 m$^2$/g, between about 1 and about 600 m$^2$/g, between about 1 and about 400 m$^2$/g, between about 1 and about 200 m$^2$/g or between about 1 and about 100 m$^2$/g of resin. In another example, the specific surface area of the substrate is between about 3 and about 1,000 m$^2$/g, between about 3 and about 800 m$^2$/g, between about 3 and about 600 m$^2$/g, between about 3 and about 400 m$^2$/g, between about 3 and about 200 m$^2$/g or between about 3 and about 100 m$^2$/g of resin. In yet another example, the specific surface area of the substrate is between about 10 and about 1,000 m$^2$/g, between about 10 and about 800 m$^2$/g, between about 10 and about 600 m$^2$/g, between about 10 and about 400 m$^2$/g, between about 10 and about 200 m$^2$/g or between about 10 and about 100 m$^2$/g of resin.

In one example, the substrate includes negatively or positively ionizable or charged groups bound to the surface. For example, silica gel carries negative surface charge above pH 4, and $Al_2O_3$ can have positive surface charge in acidic conditions and negative surface change in alkaline conditions. In another example, a polymeric organic substrate is made from monomers that provide ion-exchange groups and optionally hydrophilic moieties on the surface of the substrate. A monomer that can be used to prepare polymeric substrates or nanoparticles with ion-exchange groups is acrylic acid. An exemplary substrate is a co-polymer of acrylic acid and one or more additional monomers. The resulting polymeric substrate will include carboxylic acid groups (cation exchange groups). Anion exchange groups, such as amines (anion exchange groups) may be introduced into a polymeric substrate by using monomers prepared from activated acrylic acid (e.g., acid chloride) and a diamine Exemplary monomers according to this example include monomers related to N-(2-aminoethyl)acrylamide and N-(2-aminopropyl)acrylamide. Exemplary monomers include N-(2-(dimethylamino)ethyl)acrylamide and N-(2-(dimethylamino)propyl)acrylamide). Other monomers, which can be further modified either before or after polymerization to create a polymer with ion-exchange groups include glycidyl acrylate, glycidyl methacrylate, vinylbenzyl acetate, and 2-glycidyloxyethyl methacrylate, methyl acrylate, vinylbenzyl chloride, vinylbenzyl alcohol, vinylbenzyl glycidyl ether, 2-(4-vinylbenzyloxy)ethanol, 2-(4-vinylbenzyloxy)ethyl glycidyl ether. For example, the ester group of methyl acrylate can be hydrolyzed after polymerization to afford a polymer with carboxylic acid groups. In another example, the glycidyl group of the above listed monomers can be further modified by reaction with a nucleophilic ligand such as an amine or sulfhydryl-containing ligand. Methods for the modification of polymeric substrates are further discussed herein, below.

In preferred embodiments, the substrate is suitable for chemical modification with an organic ligand. In one example, the substrate is an organic polymeric substrate. Such substrates can be modified with an organic ligand by taking advantage of functional groups present on the polymer. In one example, the polymer is a co-polymer of styrene and divinylbenzene (PS-DVB) functionalized with a ligand incorporating an amino group or a carboxylic acid group. The ligand may be derived from a thiol-group containing precursor. The thiol analog may be heated with the polymer in the presence of a radical initiator, such as 2,2'-azobis(2-methylpropionitrile).

In another example, the substrate is an inorganic substrate, such as silica. Silica can be covalently modified using reactive silyl ligands.

Exemplary ligands and methods of their attachment to the substrate are described herein below.

B. Ligands

In various examples, the substrate of component A (e.g., at least the inner lining of the substrate pores when component A is porous) is covalently modified with at least two types of organic ligand, a hydrophilic ligand and an ion exchange ligand, which can be the same or different ligands. In one example, the ligand includes at least one ion-exchange group, e.g., an ionizable or ionic group. Ion-exchange groups are described herein and include anionic, cationic, amphoteric and zwitterionic groups. Anion-exchange groups include primary, secondary, tertiary and quaternary amines, as well as any other proton-accepting functionalities. Cation exchange groups include sulfonates, sulfates, carboxylates, phosphonates, phosphates, silanols and any other proton-donating functionalities. Amphoteric and zwitterionic ligands include at least one anion-exchange and at least one cation-exchange group, each of which can be selected from the above described ion-exchange groups.

The ion-exchange and hydrophilic ligands that are linked to the substrate form a functional (e.g., ion-exchange) layer (e.g., alongside the inner walls of the substrate pores) that is charged (either positively or negatively) under certain conditions. For example, under suitable pH conditions (e.g., pH below 7), a substrate functionalized with an anion-exchange ligand is positively charged.

Attachment of Ligands to the Solid Support

In one example, the solid support is functionalized using reactive ligand precursors ("reactive ligands"). For example, the reactive ligand (e.g., silyl ligand) includes a reactive functional group, useful for attachment to the solid support. The reactive functional group of the ligand is capable of reacting with the solid support (e.g., with complementary reactive functional groups on the surface of the solid support) to form one or more covalent bonds. See, e.g., FIG. 2-FIG. 4.

Attachment of Ligands to an Inorganic Solid Support

Methods for the attachment of ligands to inorganic substrates, such as silica substrates are known. Exemplary methods are described herein and, e.g., in WO2006/088760 (filed Feb. 10, 2006), WO2006/0054559 (filed Sep. 10, 2004), WO2005/047886 (filed Oct. 4, 2004), U.S. patent application Ser. No. 11/753,934 (filed May 25, 2007), H. Minakuchi et al., *Anal. Chem.* 1996, 68: 3498-3501, H. Minakuchi et al., *J. Chromatogr.* 1998, 797: 121-131 U.S. Pat. Nos. 6,248,798, 5,968,363, 5,865,994, 5,936,003, 5,925,253, the disclosures of which are each incorporated herein by reference for all purposes.

In one example, the reactive ligand includes a reactive silyl group. For example, the reactive silyl group can react with the surface of a silica substrate comprising surface silanol (e.g., Si—OH) groups to create siloxane bonds between the silyl ligand and the silica substrate. In various embodiments, the reactive ligand includes an activated silyl group having a structure according to Formula (I):

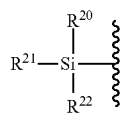

(I)

In exemplary silyl groups according to Formula (I), $R^{20}$, $R^{21}$ and $R^{22}$ are independently selected silyl group substituents. An activated silyl group includes at least one reactive silyl group substituent. A reactive silyl group substituent is capable of reacting with a substrate of the invention to form a covalent bond between the reactive ligand and the substrate. Thus, at least one of $R^{20}$, $R^{21}$ and $R^{22}$ is a reactive silyl group substituent. Exemplary reactive silyl group substituents include alkoxy groups, halogens, primary or secondary amino groups and carboxylic acid groups.

In one embodiment, $R^{20}$, $R^{21}$ and $R^{22}$ are members independently selected from halogen, $OR^{14}$, $NR^{14}R^{15}$, $OC(O)R^{16}$, $OS(O)_2R^{16}$, acyl, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. Each $R^{14}$ and each $R^{15}$ is a member independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl. Each $R^{16}$ is a member independently selected from substituted or unsubstituted alkyl, substituted or unsubstituted heteroalkyl, substituted or unsubstituted aryl, substituted or unsubstituted heteroaryl and substituted or unsubstituted heterocycloalkyl. In one embodiment, at least one of $R^{20}$, $R^{21}$ and $R^{22}$ is other than OH, unsubstituted alkyl, unsubstituted aryl, unsubstituted heteroaryl and unsubstituted heterocycloalkyl. In another embodiment, at least one of $R^{20}$, $R^{21}$ and $R^{22}$ is alkoxy or halogen. Exemplary reactive silyl groups useful for the covalently linkage of a reactive ligand to the solid support include:
—Si(OMe)$_3$; —SiMe(OMe)$_2$; —SiMe$_2$(OMe); —Si(OEt)$_3$; —SiMe(OEt)$_2$; —SiMe$_2$(OEt), —SiCl$_3$, —SiMeCl$_2$; —SiMe$_2$Cl, —SiCl$_2$(OMe), and —SiCl(OMe)$_2$.

In one example, one of $R^{20}$, $R^{21}$ and $R^{22}$ is a non-reactive silyl group substituent. In another example, two of $R^{20}$, $R^{21}$ and $R^{22}$ are non-reactive silyl group substituents. Exemplary non-reactive silyl group substituents include alkyl groups or aryl groups. In one embodiment, one or two of $R^{20}$, $R^{21}$ and $R^{22}$ are members independently selected from unsubstituted $C_1$-$C_6$ alkyl (e.g., methyl, ethyl, n-propyl, iso-propyl, n-butyl, iso-butyl and the like). In yet another example two of $R^{20}$, $R^{21}$ and $R^{22}$ are members independently selected from substituted or unsubstituted alkyl, such as substituted or unsubstituted $C_1$-$C_6$ alkyl (e.g., methyl, ethyl, n-propyl, iso-propyl, n-butyl, iso-butyl and the like). In a particularly embodiment, one or two of $R^{20}$, $R^{21}$ and $R^{22}$ are methyl.

In one example, the reactive ligand, which is used for covalent modification of the solid support includes an ion-exchange group. Alternatively, the reactive ligand includes a group, which can be converted to an ion-exchange group after coupling of the reactive ligand to the solid support. For example, the reactive ligand can contain a protected acidic group (e.g., a terminal ester group), which is de-protected to provide a free acid (e.g., carboxylic acid group) after coupling of the ligand to the solid support.

Any number of different ion-exchange and non-ion-exchange ligands (e.g., hydrophilic) can be bound to the solid support. In one example, the functional layer consists essentially of two types of ligand (HILIC and/or anion-exchange and/or cation-exchange). In another example, the functional layer includes at least three different types of ligands independently selected from HILIC anion- and cation-exchange ligands. In another example, the functional layer includes at least two different types of ligands, wherein at least one ligand is an ion-exchange ligand (selected from anion- and cation-exchange ligands) and at least one ligand is a non-ionizable or non-ionic ligand (HILIC). For example, in addition to the ion-exchange ligands, the compositions of the invention can further include HILIC ligands bound to the same solid support as the ion-exchange ligands. In yet another example, the functional layer includes at least two different types of ligands, wherein both ligands are anion-exchange ligands, or both ligands are cation-exchange ligands or both ligands are HILIC ligands. In a further example, the functional layer includes at least two different types of ligands, wherein at least one ligand is an anion-exchange ligand or a cation-exchange ligand and a HILIC ligand.

The composition of the invention can include any type of ion-exchange ligand. The ligand includes at least one anion-exchange group and/or at least one cation-exchange group. Exemplary ion-exchange groups are described herein. In various examples, the ligand includes at least one of the following groups: —Z—OH, —(Z)$_n$N(R$^6$)(R$^7$), —(Z)$_n$N$^+$(R$^6$)(R$^7$)(R$^8$)X$^-$, —(Z)$_n$C(O)OR$^9$, —(Z)$_n$S(O)$_2$OR$^9$, —(Z)$_n$OP(O)(OR$^{10}$)(OR$^{11}$) and (Z)$_n$B(OR$^{10}$)(OR$^{11}$)(OR$^{12}$), wherein n is an integer selected from 0 and 1. $R^6$, $R^7$ and $R^8$ are members independently selected from H, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. $R^9$ is a member selected from H, a single negative charge and a cationic counterion. $R^{16}$ and $R^{11}$ are members independently selected from H, a single negative charge, a cationic counterion, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. $X^-$ is either present or absent, and when present is an anionic counterion. Z is a member selected from substituted or unsubstituted aryl and substituted or unsubstituted heteroaryl.

The ligands can optionally include additional polar groups (e.g., ether, thioether, amide, sulfonamide, urea, thiourea, carbonate, carbamate, and the like).

In one embodiment, the ligand has no more than 8, nor more than 7, no more than 6, no more than 5, no more than 4, no more than three 3, or no more than 2 carbon atoms in sequence. In an exemplary embodiment at least two of the carbon atoms in sequence are optionally part of a substituted or unsubstituted ring (e.g., substituted or unsubstituted aryl, substituted or unsubstituted heteroaryl, or substituted or unsubstituted cycloalkyl). In one example, the hydrophilic moiety is sufficiently hydrophilic for the ligand to exhibit HILIC characteristics. In this example, the ligand includes at least one polar group. Such a material can, e.g., be used to analyze uncharged molecules in addition to ionic or ionizable analytes (e.g., within the same sample). The added HILIC capabilities can be exploited to analyze samples containing organic hydrophilic and/or polar molecules in addition to ionic or ionizable molecules. Exemplary ligands and solid supports with HILIC moieties include ligands 2-6 (FIG. 2-4) and solid supports 11-21.

In an exemplary embodiment the ligand incorporates a moiety having a structure according to Formula (II), Formula (III), Formula (IV) or Formula (V), wherein m and n are integers independently selected from 0 and 1:

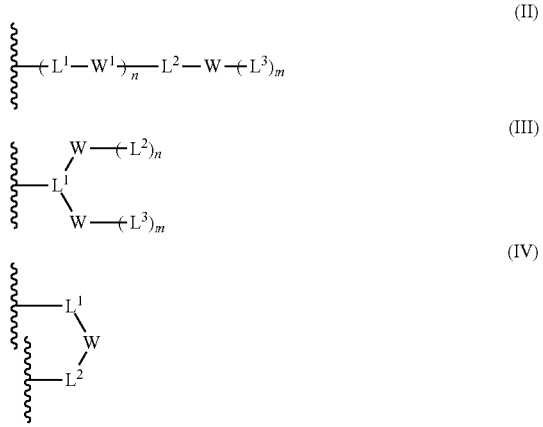

In exemplary ligands according to any of the above embodiments (e.g., in Formula (II), Formula (III), or Formula (IV)), W and $W^1$ are independently selected ion-exchange groups (e.g., ionic or ionizable groups), or uncharged polar groups.

Ion-Exchange Groups

Exemplary ion-exchange groups are described herein, above. In one example, terminally disposed ion-exchange groups (e.g., "—W") [e.g., W in Formula (II) when m is 0, W in Formula (III) when n is 0, $W^1$ in Formula (III) when m is 0] are members independently selected from —Z—OH, —$(Z)_n$N$(R^6)(R^7)$, —$(Z)_n$N$^+(R^6)(R^7)(R^8)X^-$, —$(Z)_n$C(O)O$R^9$, —$(Z)_n$S(O)$_2$O$R^9$, —$(Z)_n$OP(O)(O$R^{10}$)(O$R^{11}$) and —$(Z)_n$B(O$R^{10}$)(O$R^{11}$)(O$R^{12}$), wherein n is an integer selected from 0 and 1. In another example, internal (e.g., "—W—") ion-exchange groups [e.g., W in Formula (II) when m is 1, W in Formula (III) when n is 1, $W^1$ in Formula (III) when m is 1, W in Formula (IV)] are members independently selected from —N($R^6$)—, —N$^+(R^6)(R^7)X^-$—, —OP(O)(O$R^{10}$)O— and —B(O$R^{10}$)(O$R^{11}$)O—. $R^6$, $R^7$ and $R^8$ are members independently selected from H, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. $R^9$ is a member selected from H, a single negative charge and a cationic counterion. $R^{10}$ and $R^{11}$ are members independently selected from H, a single negative charge, a cationic counterion, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. $X^-$ is either present or absent, and when present is an anionic counterion. Z is a member selected from substituted or unsubstituted aryl and substituted or unsubstituted heteroaryl.

Polar Groups

In one example, the HILIC or ion-exchange ligand includes at least one polar group. In the formulae set forth above, in each occurrence of W and $W^1$ these groups can be a polar group rather than an ion exchange group. In an exemplary embodiment, the polar group is a non-charged polar group. In various embodiments, the ligand can include both an ion exchange group and a polar group. In exemplary ligands according to the any of the above embodiments, W and/or $W^1$ is a member selected from ether, thioether, amide, sulfonamide, carbonate, carbamate, urea or thiourea. For example, W and/or $W^1$ in Formula (II) can be any polar group useful to connect the two linker groups $L^1$ and $L^2$. In one embodiment, $L^1$ and $L^2$ are connected through an ether bond (e.g., W and/or $W^1$ is O), a thioether bond (e.g., W and/or $W^1$ is S), an amide (e.g., W and/or $W^1$ is —NHC(O)— or —C(O)NH—) or sulfonamide group (e.g., W and/or $W^1$ is —NHS(O)$_2$— or —S(O)$_2$NH—) or, alternatively, through a carbonate (e.g., W and/or $W^1$ is —OC(O)O—), carbamate (e.g., W and/or $W^1$ is —OC(O)NH— or —NHC(O)O—), urea (e.g., W and/or $W^1$ is —NHC(O)NH—) or thiourea group. In one embodiment, W and/or $W^1$ is an amide group: —C(O)N$R^{13}$— or N$R^{13}$C(O)—, wherein $R^{13}$ is a member selected from H, substituted or unsubstituted alkyl, substituted or unsubstituted heteroalkyl, substituted or unsubstituted aryl, substituted or unsubstituted heteroaryl and substituted or unsubstituted heterocycloalkyl. In a preferred embodiment, $R^{13}$ is hydrogen or lower alkyl, such as methyl.

Groups L

In exemplary ligands according to any of the above embodiments, for example, Formula (II), Formula (III), or Formula (IV), $L^1$, $L^2$ and $L^3$ are members independently selected from substituted or unsubstituted alkyl, substituted or unsubstituted heteroalkyl, substituted or unsubstituted aryl, substituted or unsubstituted heteroaryl, substituted or unsubstituted cycloalkyl, and substituted or unsubstituted heterocycloalkyl.

In an exemplary embodiment, $L^1$ is a phenyl group substituted with two carboxylic moieties (e.g., Phase 12.), corresponding to W and $W^1$. In another exemplary embodiment, $L^1$ is substituted or unsubstituted alkyl terminally substituted with an amide, an amine (1°, 2°, 3°, or 4°) or a urea. In various embodiments, Component A includes two such ligands (e.g., Phase 15). In various embodiments $L^1$ is substituted or unsubstituted alkyl, $W^1$ is O or $OCH_2OH$, and W is an amine (primary, secondary, tertiary or quaternary) (e.g., Phase 17).

In one embodiment, the ligands of the invention include at least one hydrophilic moiety. In one example, at least one of $L^1$, $L^2$ and $L^3$ in the above formulae includes a hydrophilic (polar) moiety. For example, when in Formula (II) n is 1, at least one of $L^1$ and $L^2$ includes a hydrophilic moiety. In another example, when n is 0, $L^2$ includes a hydrophilic moiety. The term "hydrophilic moiety" is defined herein. The hydrophilic moiety may be included in an internal part of the ligand or can be found in the terminal part of a ligand, for example, $L^2$ in Formula (III).

Figure 2:
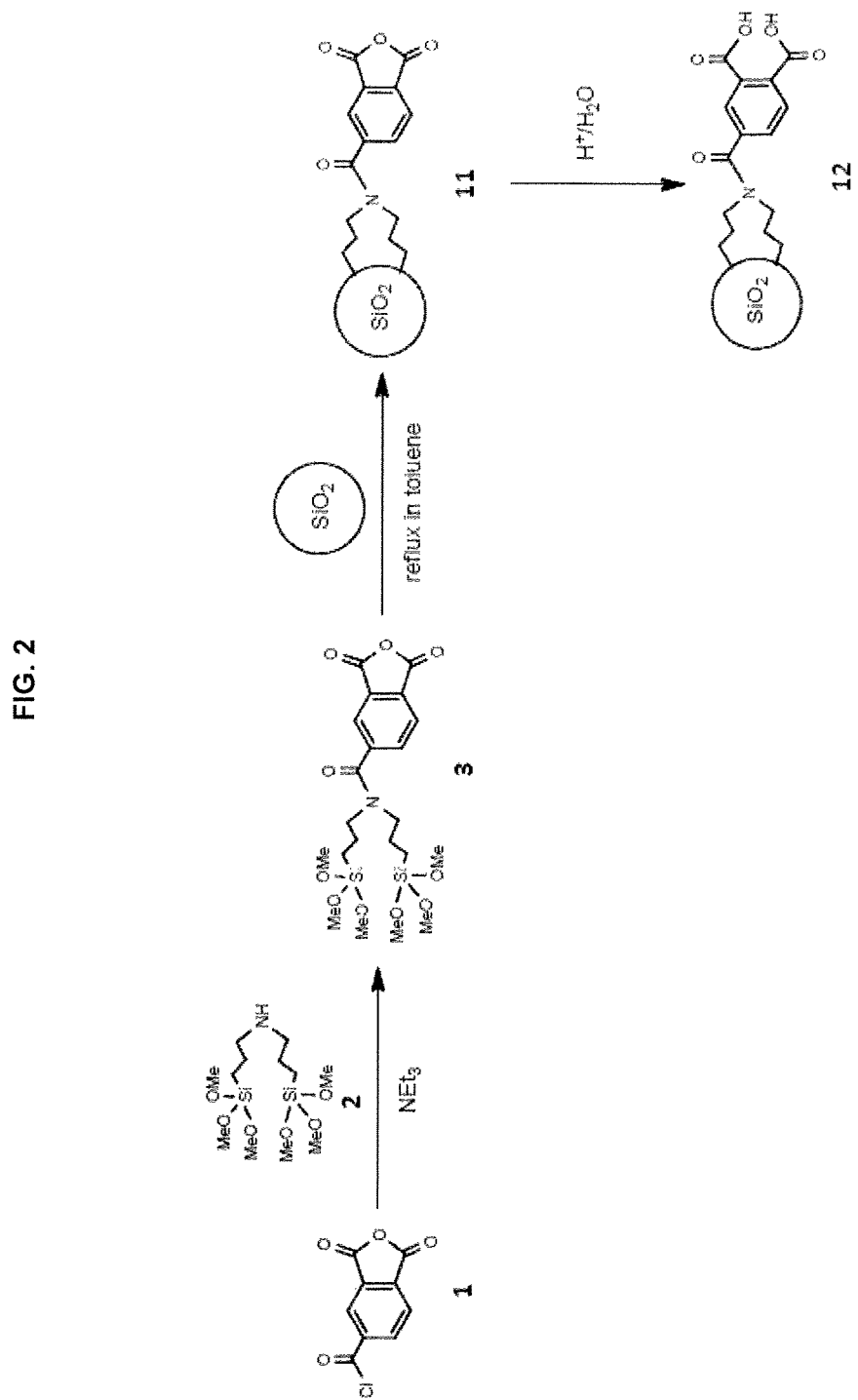
FIG. 2. Preparation of weak cation-exchange (WCX)/HILIC bonded phase using a single type of silyl ligand.
Figure 3:
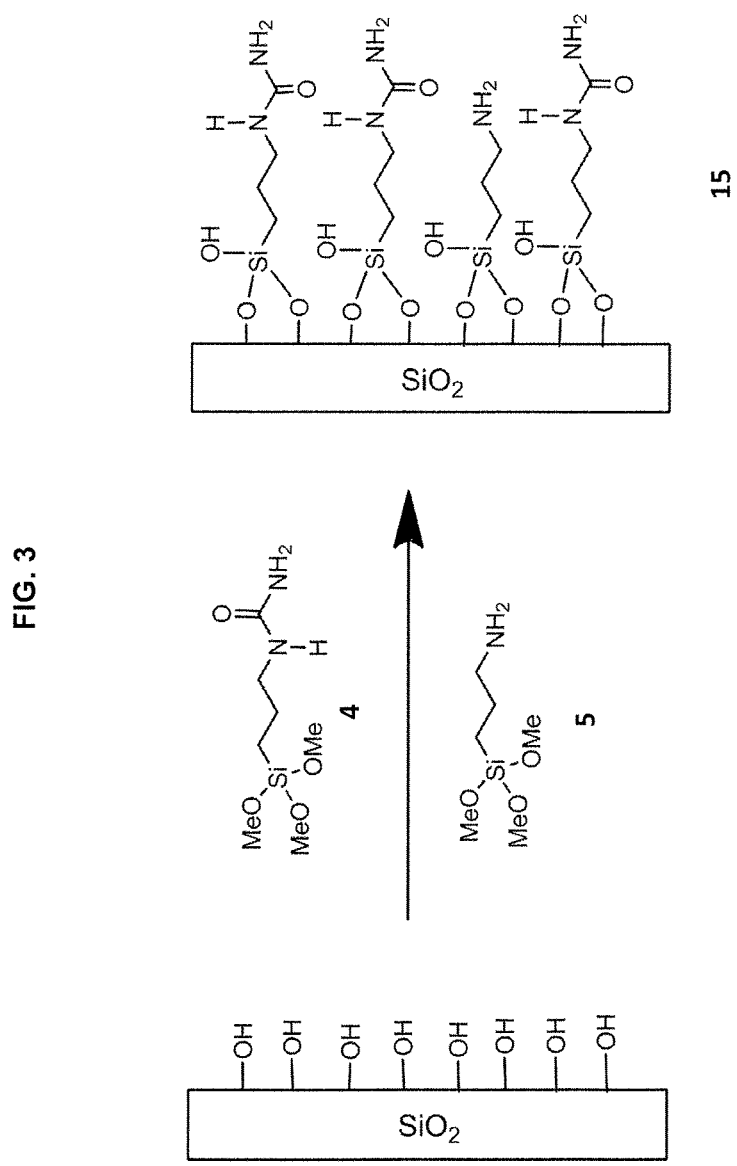
FIG. 3. Preparation of weak anion-exchange (WAX)/HILIC bonded phase using a mixture of two types of silyl ligands.
Figure 4:
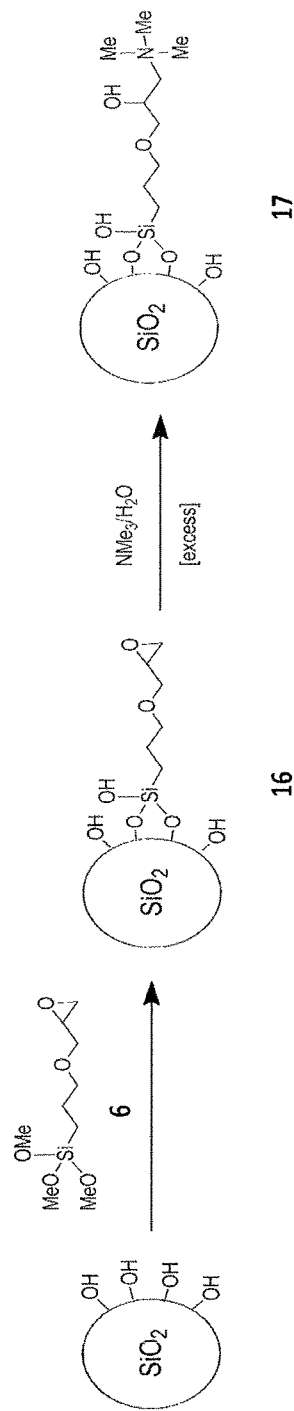
FIG. 4. Preparation of strong anion-exchange (SAX)/HILIC bonded phase by quaternization of oxirane bonded phase.

Exemplary reactive silyl ligands of the invention are shown in FIG. 2-FIG. 4.

Additional reactive ligands, substrates and functionalized substrates useful in the present invention are disclosed e.g., in WO2006/088760 (filed Feb. 10, 2006), WO2006/0054559 (filed Sep. 10, 2004) and WO2005/047886 (filed Oct. 4, 2004), the disclosures of which are each incorporated herein by reference for all purposes.

Exemplary functionalized substrates of the present invention have at least one ligand-substrate component having a structure according to Formula (II), Formula (IIa), and Formula (IVa):

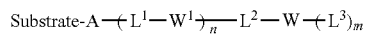  (IIa)

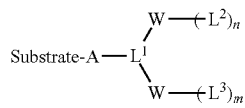  (IIIa)

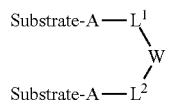  (IVa)

wherein n, m, Y, W, $W^1$, $W^2$, $W^3$, $L^1$, $L^2$ and $L^3$ are defined as hereinabove. Each A is an independently selected linker group, which connects the ligand to the substrate (solid support) and is derived from the reactive functional group used to covalently link the ligand to the solid support. In one example, each A is an independently selected silyl group.

Hence, the invention provides compositions including a functionalized substrate incorporating a structure according to one of the following formulae:

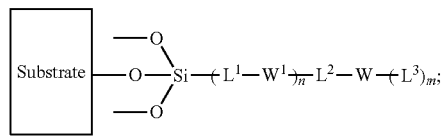

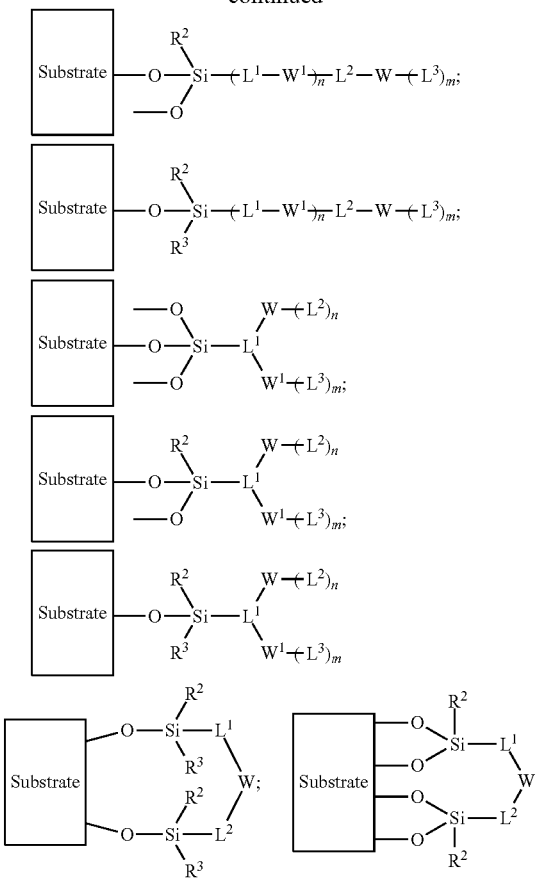

wherein n, m, W, $W^1$, $L^1$, $L^2$ and $L^3$ are defined as hereinabove. $R^2$ and $R^3$ are members independently selected from acyl, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. In one example, $R^2$ and $R^3$ are members independently selected from substituted or unsubstituted alkyl and substituted or unsubstituted aryl. In one embodiment, one or two of $R^2$ and $R^3$ are members selected from unsubstituted $C_1$-$C_6$ alkyl (e.g., methyl, ethyl, n-propyl, iso-propyl, n-butyl, iso-butyl and the like). In yet another example two of $R^2$ and $R^3$ are members independently selected from substituted or unsubstituted alkyl, such as substituted or unsubstituted $C_1$-$C_6$ alkyl (e.g., methyl, ethyl, n-propyl, iso-propyl, n-butyl, iso-butyl and the like). In a particularly embodiment, one or two of $R^2$ and $R^3$ are methyl. In another embodiment both of $R^2$ and $R^3$ are methyl.

Attachment of Ligands to an Organic (Polymeric) Solid Support

Methods for the attachment of ligands to organic substrates, such as polymeric resins are known to those of skill in the art. In one example, the substrate is prepared from monomers, which after polymerization provide unsaturated groups, such as vinyl groups. In one example, the polymer is a co-polymer of styrene and divinylbenzene (PS-DVB). The unsaturated groups (e.g., vinyl groups) of these resins can be used to attach an ion-exchange ligand. In one example, the ligand includes a thiol-group, which is added to the double bond via an addition mechanism involving radical intermediates, thereby forming a thio-ether bond between the ligand and the solid support. Such reactions are described, e.g., in WO/03022433 (filed Sep. 5, 2002). For example, anion exchange groups (e.g., amino groups) or cation exchange groups (e.g., carboxylic acid groups) are added to the solid support by heating (and/or treating with light) a vinyl-group containing resin (e.g., PS-DVB) with a reactive ligand incorporating a thiol group in the presence of a radical initiator, such as 2,2'-azobis(2-methylpropionitrile). The ligand further includes at least one anion-exchange group (e.g., primary, secondary, tertiary or quaternary amino group), at least one cation exchange group, or at least one latent ion-exchange group, which can be converted to an ion-exchange group after linkage of the ligand to the solid support (e.g., an ester group, which is can be hydrolyzed). An exemplary method is illustrated in Scheme 1, below:

Scheme 1:

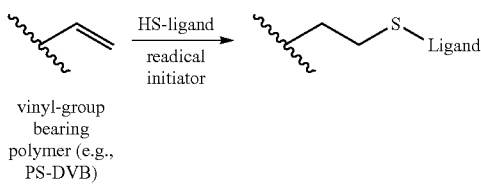

vinyl-group bearing polymer (e.g., PS-DVB)

Exemplary ligands useful in the above methods include:

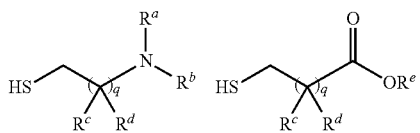

wherein q is an integer selected from 1 to 50. In one example, q is a member selected from 1 to 18. In another example, q is a member selected from 1 to 10. In a particular example, q is 1. In one example, $R^a$, $R^b$ and $R^e$ are members independently selected from H, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. In another example, $R^a$, $R^b$ and $R^e$ are members independently selected from H and substituted or unsubstituted ($C_1$-$C_4$)alkyl. In a particular example, $R^a$ and $R^b$ are independently selected from H and methyl. In another particular example, $R^e$ is a member selected from methyl and ethyl. Each $R^c$ and each $R^d$ are members independently selected from H, hydroxyl, halogen, cyano, alkoxy, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl.

In another approach, the organic polymeric solid support incorporates a monomer that provides a reactive functional group, which can be used to covalently link an ion-exchange ligand to the solid support. In one example, the monomer incorporates a carboxylic acid group or an ester group, which can be hydrolyzed to form a carboxylic acid group after polymerization. Exemplary monomers according to this example include acrylic acid, methacrylic acid, alkyl (e.g., methyl or ethyl) acrylates and alkyl (e.g., methyl or ethyl) methacrylates. The carboxylic acid group can be reacted with a complimentary reactive functional group on the ligand. In one example, the ligand includes an amino group, which can be reacted with the carboxylic acid group to form an amide bond between the solid support and the ligand. The carboxylic acid group can be activated, for example, by formation of an acid chloride prior to reaction with the reactive ligand.

In another example, the polymeric solid support incorporates a monomer that includes an epoxide group. The epoxide ring can be opened using a nucleophilic ligand thereby forming a covalent bond between the ligand and the solid support. For example, the ligand can include an amino group (e.g., a primary amino group) or a sulfhydryl group, which can react with the epoxide ring to form, e.g., an amine or a thio-ether linkage between the ligand and the solid support, respectively. Exemplary monomers that include an epoxide ring and can be incorporated into a polymer include glycidyl acrylate, glycidyl methacrylate, 2-glycidyloxyethyl methacrylate, vinylbenzyl glycidyl ether, 2-(4-vinylbenzyloxy)ethyl glycidyl ether. An exemplary method is illustrated in Scheme 2, below:

Scheme 2:

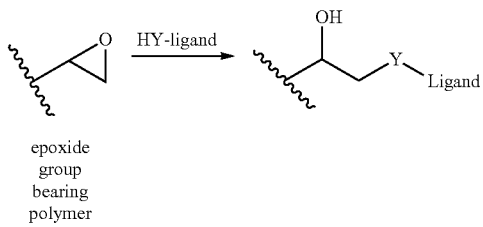

epoxide group bearing polymer wherein YH is a nucleophilic group, such as a sulfhydryl group or a primary amino group. Y is a group derived from reaction of the nucleophilic group with the epoxide ring.

Exemplary nucleophilic ligands useful in the above methods include:

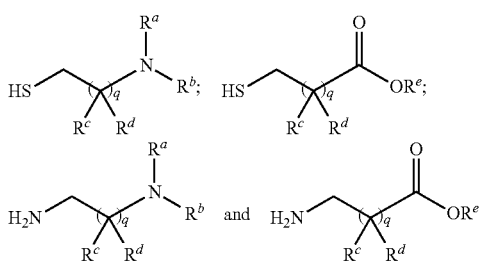

wherein q, $R^a$, $R^b$, $R^c$, $R^d$ and $R^e$ are defined as herein above.

In yet another example, the polymeric solid support incorporates a monomer that includes a leaving group, such as a halogen substituent, which can, e.g., be replaced with a nucleophilic ligand in a nucleophilic substitution reaction thereby forming a covalent bond between the ligand and the solid support. An exemplary monomer is vinylbenzyl chloride.

In a further example, the polymeric solid support incorporates a monomer that includes a hydroxyl group or a sulfhydryl group. The hydroxyl group can, e.g., be used to covalently link a ligand to the solid support via the formation of an ether-bond or a thio-ether bond, respectively. Exemplary monomers incorporating a hydroxyl group include vinylbenzyl alcohol and 2-(4-vinylbenzyloxy)ethanol.

Nanoparticles

The nanoparticles of use in the present invention can be formed from inorganic or organic material. The nanoparticles may be formed from any known (e.g., synthetic) ion-exchange resin. Exemplary nanoparticles include a polymeric material, such as a resin polymer (e.g., synthetic resin polymer). Resin polymers are known in the art and include latex and latex-derived materials. Exemplary nanoparticles are disclosed in U.S. Pat. Nos. 5,324,752 and 5,532,279 to Barretto et al. and U.S. Pat. No. 4,376,047 to Pohl et al., the disclosures of which are each incorporated herein by reference for all purposes. In one example, the nanoparticle includes a dendrimer.

The nanoparticles of the present invention can be formed using known techniques and those described herein. In one example, the nanoparticles are made using an emulsion polymerization technique. Exemplary nanoparticles are formed by heating and stirring a suspension of at least one monomer in a suitable solvent in the presence of a suitable emulsifying agent. Alternatively, the polymerization may be carried out by a suspension, bulk or solution process followed by grinding the resin to a desired size by mechanical means, such as milling (e.g., ball mills, rod mills or the like). In one example, very fine particles (fines), which form during various polymerization procedures (and are often removed as a side-product), can be used as the nanoparticles in the compositions of the invention.

In another example, the nanoparticles are formed from cross-linked polymers. The nanoparticles can, e.g., be formed from glycidyl acrylates, glycidyl methacrylates, poly(vinylaromatic) resins, such as styrene-divinylbenzene copolymer, divinylbenzene-vinylbenzylchloride copolymer, or methacrylate-vinylbenzylchloride copolymer, or divinylbenzene-vinylbenzylglycidylether (or acrylic epoxy type monomers) or other vinyl monomers containing epoxy substituents. Other exemplary nanoparticles include monomers that incorporate reactive functional groups, such as reactive halides (e.g., vinylbenzylbromide or bromoethylmethacrylate) or anhydrides (e.g., co-polymers of maleic anhydride and divinylbenzene).

In one example, the nanoparticle is a latex particle. Latex particles can be derived from latex emulsions. Methods for the preparation of nanoparticles are known. Exemplary methods are described herein (see, e.g., Example 3) and in U.S. Pat. Nos. 5,936,003; 5,925,253; 5,532,279 and 5,324,752, each incorporated herein by reference for all purposes.

In one embodiment, the latex particles comprise a cross-linked polymer or copolymer containing about 0.25% to about 100% monomer by weight. In a preferred embodiment, the latex particles comprise a cross-linked polymer or copolymer containing between about 1% to about 5% monomer by weight.

In another example, the nanoparticle is derived from inorganic material, such as silica, alumina, zirconia and titania. Exemplary methods for the preparation of inorganic nanoparticles include those suitable for the preparation of inorganic substrates, known in the art. For example, silica particles with very small particle sizes have been described (e.g., those suitable for ultra-pressure chromatography). See, e.g., R. E. Majors, *LCGC* 2006, 24(S4): 8-15; R. E. Majors, *LCGC* 2008, 26(3): 8-15; and R. E. Majors, *LCGC* 2008, 26(S4): 10-17. The inorganic material can be functionalized with ion-exchange groups, e.g., via ion-exchange ligands (e.g., using reactive silyl ligands) as described herein for the functionalization of a solid support.

In various examples according to any of the above embodiments, the nanoparticles include ion exchange groups (e.g., to create negative or positive charges). The charge associated with the ion-exchange groups on the surface of the particle can be used to attach the nanoparticle (e.g., latex particles) to the solid support (e.g., silica) via electrostatic attachment (see e.g., U.S. Pat. No. 5,532,279 to Baretto et al., incorporated herein by reference). The ion-exchange groups may be derived from a monomer incorporated into the nanoparticle during polymerization. In another example, the synthesis of the nanoparticle yields a neutral surface. If the synthesis of the nanoparticle yields a neutral surface, the nanoparticles is further processed to add ion-exchange groups at least to the surface of the nanoparticle, e.g., by covalently binding of organic ion-exchange ligands to the surface of the nanoparticle. The ligands can optionally provide additional hydrophilic functionality. For example, the surface of the nanoparticle is covalently functionalized with reactive ion-exchange ligands, e.g., in a manner described herein above for the modification of a polymeric organic substrate with organic ligands. In one example, the reactive ligand includes a thiol group and is covalently linked to the surface of a latex particle (e.g., via functionalization of an unsaturated moiety, such as a vinyl groups). Methods for the functionalization of organic polymeric resins are described hereinabove for the modification of the solid support. Each of those methods equally applies to the preparation of organic polymeric nanoparticles.

The term ion-exchange group is defined herein. Exemplary ion-exchange groups are described herein above (e.g., in connection with the ligands) and those embodiments equally apply to the embodiments in connection with the nanoparticles. Exemplary ion-exchange groups of the nanoparticles include: $-Z-OH$, $-(Z)_nN(R^6)(R^7)$, $-(Z)_nN^+(R^6)(R^7)(R^8)X^-$, $-(Z)_nC(O)OR^9$, $-(Z)_nS(O)_2OR^9$, $-(Z)_nOP(O)(OR^{10})(OR^{11})$ and $-(Z)_nB(OR^{10})(OR^{11})(OR^{12})$, wherein n is an integer selected from 0 and 1. $R^6$, $R^7$ and $R^8$ are members independently selected from H, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. $R^9$ is a member selected from H, a single negative charge and a cationic counterion. $R^{16}$ and $R^{11}$ are members independently selected from H, a single negative charge, a cationic counterion, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. $X^-$ is either present or absent, and when present is an anionic counterion. Z is a member selected from substituted or unsubstituted aryl and substituted or unsubstituted heteroaryl.

Size of the Nanoparticles

The nanoparticles (e.g., latex-particles) can have any size and shape. In one example, the nanoparticles have a median diameter ranging from about 0.2 nm to about 1000 nm (1 μm). In another example, the nanoparticles have a median diameter ranging from about 1 nm to about 900 nm, from about 1 nm to about 800 nm, from about 1 nm to about 700 nm, from about 1 nm to about 600 nm, from about 1 nm to about 500 nm, from about 1 nm to about 400 nm, from about 1 nm to about 300 nm, from about 1 nm to about 200 nm or from about 1 nm to about 100 nm. In yet another example, the nanoparticles have a median diameter ranging from about 2 nm to about 100 nm, from about 4 nm to about 100 nm, from about 6 nm to about 100 nm, from about 8 nm to about 100 nm, or from about 10 nm to about 100 nm. In yet another example, the nanoparticles have a median diameter ranging from about 10 nm to about 1000 nm, from about 10 nm to about 900 nm, from about 10 nm to about 800 nm, from about 10 nm to about 700 nm, from about 10 nm to about 600 nm, from about 10 nm to about 500 nm, from about 10 nm to about 400 nm, from about 10 nm to about 300 nm, or from about 10 nm to about 200 nm. In one example, the nanoparticle is a latex-particle having an average particle size of between about 2 nm and about 90 nm. In a further example, the nanoparticles have a median diameter of at least about 2 nm, at least about 4 nm, at least about 6 nm, at least about 8 nm, or at least about 10 nm. In another example, the nanoparticles have a median diameter of at least about 20 nm, at least about 30 nm, at least about 40 nm, at least about 50 nm, at least about 60 nm, at least about 70 nm, at least about 80 nm, at least about 90 nm, or at least about 100 nm. In a further example, the nanoparticles have a median diameter of at least about 200 nm, at least about 300 nm, at least about 400 nm, at least about 500 nm, at least about 600 nm, at least about 700 nm, at least about 800 nm, at least about 900 nm, or at least about 1000 nm.

Ratio Between Nanoparticle Size and Substrate Pore Size

In one embodiment, the nanoparticles have an average particle size equal to the average diameter of the substrate-pores. In another embodiment, the nanoparticles have an average particle size larger than the average diameter of the substrate-pores (e.g., to essentially block the nanoparticles from penetrating into the interior pores). In one example the ratio of the average diameter of the nanoparticles (e.g., latex particles) to the average diameter of the substrate pores ranges between about 1:1 and about 1000:1. In one example the ratio of the average diameter of the nanoparticles to the average diameter of the substrate pores ranges between about 1.2:1 and about 100:1, between about 1.4:1 and about 100:1, between about 1.6:1 and about 100:1, between about 1.8:1 and about 100:1, between about 2:1 and about 100:1, between about 4:1 and about 100:1, between about 6:1 and about 100:1, between about 8:1 and about 100:1, or between about 10:1 and about 100:1. In another example the ratio of the average diameter of the nanoparticles to the average diameter of the substrate pores is at least about 1.2:1, at least about 1.4:1, at least about 1.6:1, at least about 1.8:1 or at least about 2:1. In a further example the ratio of the average diameter of the nanoparticles to the average diameter of the substrate pores is at least about 3:1, at least about 4:1, at least about 5:1, at least about 6:1, at least about 7:1, at least about 8:1, at least about 9:1, or at least about 10:1. In another example the ratio of the average diameter of the nanoparticles to the average diameter of the substrate pores is at least about 20:1, at least about 30:1, at least about 40:1, at least about 50:1, at least about 60:1, at least about 70:1, at least about 80:1, at least about 90:1, or at least about 100:1.

Ratio Between Particle-Size and Nanoparticle Size

In one example the ratio of the average diameter of the support particles to the average diameter of the nanoparticles (e.g., latex particles) ranges between about 20:1 to about 5,000:1, e.g., from about 100:1 to about 2500:1. Exemplary ratios are described in U.S. Pat. No. 4,376,047 to Pohl et al. (1983).

Attachment of the Nanoparticles to the Solid Support (Substrate)

Exemplary methods for the attachment (binding) of latex particles to silica gel and silica monoliths are described in U.S. Pat. No. 5,532,279 to Barretto; U.S. Pat. No. 5,324,752, J. P. Hutchinson et al., *J. Chromatogr.* 2006, 1109: 10-18 and K. M. Glenn et al., *J. Chromatogr.* 2007, 1155: 8-14, the disclosures of which are incorporated herein by reference in their entirety for all purposes.

Exemplary methods for the direct or indirect electrostatic attachment (binding) of latex-particles to organic substrates are described in U.S. Pat. No. 4,927,539 to Stevens et al., U.S. Pat. No. 4,351,909 to Stevens et al., U.S. Pat. No. 4,519,905 to Stevens et al., U.S. Pat. Nos. 4,383,047 and 5,532,279 to Baretto et al., the disclosures of which are each incorporated herein by reference for all purposes.

In one example, the nanoparticles are covalently bound to the exterior surface of the solid support. This can be accomplished by using complementary functional groups on the solid support and the nanoparticles which can react with each other to form a covalent bond. Exemplary reactive functional groups include amines and carboxylic acid/carboxylic acid derivatives (e.g., activated esters and the like), which can be used to form amide bonds between the solid support and the nanoparticles. In another example, click chemistry is used to covalently link the two components. In the above examples, the solid support and the nanoparticles each provide a suitable functional group and are contacted with each other under conditions sufficient to form a covalent bond between them. Methods described herein above for the covalent linkage of ligands to the solid support and the nanoparticles equally apply to the formation of covalent bonds between the nanoparticles and the solid support.

In a particular example, the nanoparticles are bound to the substrate by electrostatic force. For example, a slurry of the functionalized solid support (e.g., functionalized silica gel) in a suitable medium (e.g., aqueous medium) is contacted with a slurry of the functionalized nanoparticles (e.g., functionalized polymer latex particles) under conditions sufficient for the nanoparticles to bind to the surface of the support. The medium used to prepare the solid support slurry and the nanoparticle slurry is preferably selected so that ion-exchange groups are charged. In one example, the medium is an aqueous medium, which is optionally adjusted to a suitable pH. For example, an anion-exchange support (e.g., having amino groups) is suspended in a buffer system (e.g., ammonium acetate) providing a slightly acidic pH (e.g., about pH 5). In another example, a cation-exchange support (e.g., silica functionalized with sulfonated ligands) is suspended in a buffer system (e.g., ammonium acetate buffer) having a pH that is sufficient to produce de-protonated acidic groups (e.g., about neutral or slightly basic pH).

In one example, the nanoparticle slurry is used in a sufficient amount to provide an excess of nanoparticles. In another example, the two slurries are mixed (e.g., using a mechanical stirrer or shaker) for a sufficient amount of time to obtain a desired degree of nanoparticle loading. The reactants are mixed at a suitable temperature. In one example, the temperature is selected between about ambient temperature and about 40° C. The resulting mixture can then be filtered and the filter cake may be thoroughly washed and dried to afford a composition of the invention.

Electrostatic attachment of the nanoparticles to the solid support can alternatively be accomplished through "on-column binding". For example, a column including the ion-exchange solid support (e.g., functionalized silica gel or silica monoliths) is connected to a pump (e.g., HPLC pump) and a solution or suspension of the nanoparticles is pumped through the column under conditions sufficient for the nanoparticles to bind to the surface of the support. During this procedure, the column is kept at a suitable temperature (e.g., ambient temperature). Nanoparticles are pumped through the column for a sufficient amount of time to obtain a desired nanoparticle loading of the column. In one example, nanoparticles are pumped through the column until nanoparticles are exiting the column indicating sufficient loading. For example, by monitoring the column effluent stream for breakthrough of nanoparticles, such as latex derived particles, the completion of the nanoparticle loading can be determined. The column used in this method can be a packed column or a monolith.

In one example, the nanoparticles are attached to the exterior surface of the solid support by any method that essentially precludes removal of the nanoparticles from the solid support under normal chromatographic conditions. For example, the nanoparticles will essentially stay bound to the solid-support when subjected to strong electrolytes or shearing forces created when a liquid is passed through a bed of the chromatographic material provided by the invention. Such "irreversible" attachment methods include covalent binding, electrostatic attachment (e.g., salt-bridge formation between moieties of opposite charge), polymer entanglement, hydrogen bonding, combinations thereof and any other mechanism providing sufficient force to essentially prevent removal of the nanoparticle from the solid-support during typical chromatographic conditions (e.g., typical LC, flash chromatography or HPLC). A person of skill in the art will appreciate that under certain conditions (e.g., very high flow rates, extreme temperature, high salt conductivities (e.g., above 5M NaCl), strong acidic or basic conditions) nanoparticles can be removed from the solid-support. In addition, when the nanoparticles are attached to the solid support non-covalently, even under normal chromatographic conditions, a small percentage of the nanoparticles may be removed from the solid-support. However, such displacement does preferably not impart the function of the column.

In one embodiment, the nanoparticles can be bound to the substrate indirectly. Indirect attachment may be accomplished via another layer of nanoparticles. For example, a first layer of positively charged (e.g., aminated) latex-particles is bound to a negatively charged solid support (e.g., silica functionalized with cation-exchange groups) via electrostatic forces. A second layer of negatively charged latex particles (e.g., sulfonated latex particles) is then attached to the first layer via electrostatic forces. In another example, indirect attachment of the nanoparticles can be accomplished via a dispersant, which is irreversibly bound to the solid support, e.g., covalently or via permanent entanglement as described by Barretto et al. in U.S. Pat. No. 5,532,279, incorporated herein by reference.

In another embodiment, the nanoparticles are bound to a polymeric organic substrate of the invention via permanent physical entanglement, e.g., as described in U.S. Pat. No. 5,532,279 to Barretto et al., incorporated herein by reference.

Exemplary Compositions of the Invention

In one embodiment, the composition of the invention includes a porous silica substrate (e.g., silica gel or silica monolith) functionalized with either an anion exchange ligand (e.g., ligands including amino groups) or a cation exchange ligand (e.g., ligands including carboxylic acid or sulfonic acid groups) and a HILIC ligand. The HILIC and ion exchange ligand in some embodiments are the same ligand. In other words, the polar group and the ion exchange group are components of the same ligand. To the exterior surface of the silica substrate are bound latex particles incorporating ion-exchange groups of an opposite charge.

Figure 15:
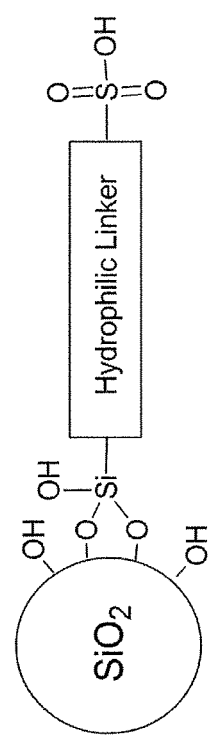

In one embodiment, a silica substrate (silica gel or silica monolith) is functionalized with anion-exchange ligands incorporating a primary, secondary, tertiary or quaternary amino group resulting in a silica anion-exchange substrate (FIG. 3, FIG. 4). To the exterior surface of the silica anion-exchange substrate are bound latex particles incorporating carboxylic acid and/or sulfonic acid groups (FIG. 15). Exemplary compositions according to this embodiment are summarized in FIG. 16 (see, e.g., composition 30). A person of ordinary skill in the art will appreciate that the exemplary amino-group bearing ligands/substrates of the compositions listed in the table of FIG. 16, can be substituted by any other amino-group bearing ligand/substrate, such as those described herein incorporated herein by reference.

In an exemplary embodiment, a silica substrate (silica gel or silica monolith) is functionalized with cation-exchange ligands incorporating carboxylic acid and/or sulfonic acid groups resulting in a silica cation-exchange substrate (FIG. 2). To the exterior surface of the silica anion-exchange substrate are bound latex particles incorporating an amino group. Exemplary compositions according to this embodiment are summarized in FIG. 16 (see, e.g., compositions 30-32 and 35-38). A person of ordinary skill in the art will appreciate that the exemplary carboxylic acid- or sulfonic acid-bearing ligands/substrates of the compositions in the table of FIG. 16 can be substituted by any other carboxylic acid- or sulfonic acid-bearing ligand/substrate, such as those described herein and incorporated herein by reference.

In an exemplary embodiment, the composition of the invention includes a porous polymeric organic substrate (e.g., a polystyrene divinylbenzene co-polymer) functionalized with either anion exchange ligands (e.g., ligands including amino groups) or cation exchange ligands (e.g., ligands including carboxylic acid or sulfonic acid groups). To the exterior surface of the silica substrate are bound latex particles incorporating ion-exchange groups of an opposite charge.

In one embodiment, a PS-DVB substrate is functionalized with anion-exchange ligands incorporating a primary, secondary, tertiary or quaternary amino group resulting in a PS-DVB anion-exchange substrate. To the exterior surface of the PS-DVB anion-exchange substrate are bound latex particles incorporating carboxylic acid and/or sulfonic acid groups.

In another embodiment, a PS-DVB substrate is functionalized with cation-exchange ligands incorporating carboxylic acid and/or sulfonic acid groups resulting in a PS-DVB cation-exchange substrate. To the exterior surface of the PS-DVB cation-exchange substrate are bound latex particles incorporating primary, secondary, tertiary or quaternary amino groups. An exemplary composition according to this embodiment is listed in FIG. 16. A person of ordinary skill in the art will appreciate that the exemplary carboxylic acid- or sulfonic acid-bearing ligands/substrates of the compositions in the table of FIG. 16 can be substituted by any other carboxylic acid- or sulfonic acid-bearing ligand/substrate, such as those described herein and incorporated herein by reference.

In another embodiment, a substrate is functionalized with cation-exchange ligands incorporating carboxylic acid and/or sulfonic acid groups by polymeric encapsulation resulting in a polymer encapsulated HILIC/cation-exchange substrate. To the exterior surface of the substrate are bound latex particles incorporating primary, secondary, tertiary or quaternary amino groups. Exemplary compositions according to this embodiment are listed in FIG. 16. A person of ordinary skill in the art will appreciate that the exemplary carboxylic acid- or sulfonic acid-bearing ligands/substrates of the compositions in the table of FIG. 16 can be substituted by any other carboxylic acid- or sulfonic acid-bearing ligand/substrate, such as those described herein and incorporated herein by reference.

Columns

The current invention also provides embodiments, in which the compositions of the invention are contained in a container. The container is preferably a chromatography column. Exemplary chromatography columns include metal columns, glass columns and columns made from a polymeric material, such as plastics. Metal columns may be those commonly used for chromatography procedures employing high pressure (e.g., HPLC, ultra pressure). Plastic columns may be those commonly employed for preparative chromatography systems. Such polymeric columns are frequently disposable and are often referred to as cartridges. A metal column may have an inner volume lined with plastic such as polyetheretherketone (PEEK). Hence, in one embodiment, the invention provides a chromatography column packed with a separation medium that includes a composition of the invention. In another example, the invention provides a chromatography column including a monolithic composition of the invention. In yet another example, the invention provides a composition of the invention in a flow-through bed suitable for use as a chromatographic medium.

IV. Methods

The compositions and compounds of the invention may be synthesized using methods known in the art and those described herein (see e.g., Examples 1 to 20). Variation of those methods may be necessary to synthesize compositions of certain embodiments. Those alternative methods will be apparent to a person of skill in the art. Starting materials and reagents useful for preparing the compositions and compounds of the invention are commercially available or can be prepared using art-recognized methodologies. Exemplary methods for the preparation of reactive silyl ligands and the preparation of exemplary functionalized substrates are provided e.g., in WO2006/088760 (filed Feb. 10, 2006), WO2006/0054559 (filed Sep. 10, 2004) and WO2005/047886 (filed Oct. 4, 2004), the disclosures of which are each incorporated herein by reference for all purposes. Other reactive silyl ligands are commercially available.

Generally, the compositions of the invention can be prepared as follows: When the synthesis of the porous substrate yields a material with ion-exchange groups at least on the surface (either with or without hydrophilic character), the material can be used for the next step which, in an exemplary embodiment is the binding of one or more HILIC and/or ion-exchange ligand to the surface. When the synthesis of the substrate yields a neutral surface, the substrate is covalently modified with ion-exchange ligands (either with or without hydrophilic character) and HILIC ligands. Modification with the ion exchange ligand includes at least the surface pores. Separately, or in the presence of the substrate, the nanoparticles are synthesized. Those particles can be used without further modification when their synthesis yields a material with ion-exchange groups at least on the surface (either with or without hydrophilic character). When the synthesis of the nanoparticles yields a neutral surface, the nanoparticles are modified with ion-exchange groups at least on the surface (either with or without hydrophilic character). When the synthesis of the nanoparticles takes place separately, the substrate is subsequently contacted with the functionalized nanoparticles.

Accordingly, the current invention further provides a method for making a composition of the invention, e.g., for the separation of analytes in a liquid sample. In one embodiment, the method includes: (a) bonding ion-exchange nanoparticles, directly or indirectly, to an exterior surface of a porous solid support, wherein the solid support is non-porous, or includes interior walls defining interior pores extending to openings in the exterior surface and wherein the surface and/or the interior walls are covalently functionalized with ion-exchange ligands and HILIC ligands. The ligands include at least one ion exchange group having a first charge (selected from positive and negative). The ion-exchange and HILIC ligands can be the same ligand or different ligands. The nanoparticles include ion exchange groups having a second charge selected from positive and negative. The second charge is preferably opposite to the first charge. In certain embodiments, the average diameter of the nanoparticles is equal to or larger than the average diameter of the pores. The above method can further include (b) covalently bonding organic ligands to the solid support including the interior walls.

Another exemplary method includes: (a) providing a non-porous or a solid support having an exterior surface and interior walls defining interior pores extending to openings in the exterior surface; (b) covalently bonding organic ligands to the surface and/or the interior walls. The ligands include at least one ion exchange group having a first charge (selected from positive and negative) and one HILIC ligand. The method further includes (c) bonding nanoparticles, directly or indirectly, to the exterior surface of the solid support (e.g., irreversibly). The nanoparticles include ion exchange groups having a second charge selected from positive and negative. The second charge is preferably opposite to the first charge. In certain embodiments, the average diameter of the nanoparticles is equal to or larger than the average diameter of the pores.

Chromatographic Methods

The current invention further provides a chromatographic method (e.g., for separating analytes in a liquid sample). The method involves flowing a liquid through a monolith, or a packed bed of separation medium, that includes a composition of the invention. In one example, the liquid includes an analyte. For example, the liquid includes at least one type of anion (e.g., organic and/or inorganic anions) and at least one type of cation (e.g., organic and/or inorganic cations) each essentially retained by the separation medium. In another example, the liquid includes at least one type of anion (e.g., organic and/or inorganic anions), at least one type of cation (e.g., organic and/or inorganic cations) and at least one type of uncharged molecule (e.g., hydrophilic molecules, such as glycans), each essentially retained by the separation medium. In yet another example, the above method can be used to separate at least one type of anion (e.g., organic and/or inorganic anions) and at least one type of cation (e.g., organic and/or inorganic cations).

In one example, the mobile phase useful in the methods of the invention, includes water. The water content of the mobile phase is preferably between about 0.1% (v/v) and 100% (v/v), more preferably between about 1% and about 100% (v/v), even more preferably between about 10% and about 100% (v/v) and most preferably between about 20% and about 100% (v/v).

The invention further provides a method of separating analytes in a liquid sample comprising flowing said liquid sample through a chromatographic medium comprising a composition of the invention.

Each of the embodiments and examples outlined herein above for the compositions of the invention, equally apply to the methods of the invention. For example, each embodiment regarding the type of the solid support, the size of the solid support particles, the pore size, the structure and nature of the organic ion-exchange ligands, the type and size of the nanoparticles, the type and nature of the ion-exchange groups and the type and nature of the hydrophilic moieties as outlined herein above, is equally applicable to the methods of the invention.

In one example, the method employs a composition that includes a porous solid support and nanoparticles bound to the solid support. The composition includes cation-exchange groups, anion-exchange groups and reverse-phase moieties, wherein the cation-exchange and anion-exchange groups are sufficiently spaced from each other to avoid interactions between them. The reverse-phase moieties are provided by organic ligands covalently linked to the solid support.

In another example, the method employs a composition including: (a) a porous solid support. The porous solid support has an exterior surface and interior pores defined by interior walls. The pores extend to openings in the exterior surface. The composition further includes (b) organic ion-exchange ligands covalently bound to the solid support including the interior walls of the pores. In various examples, the ligands include ion-exchange groups optionally having a first charge (selected from positive and negative). The composition further includes (c) nanoparticles (e.g., latex particles) including ion-exchange groups optionally having a second charge (selected from positive or negative), wherein the second charge is opposite to the first charge. The nanoparticles are bound (e.g., via electrostatic attraction), either directly or indirectly (e.g., via additional layers of nanoparticles) to the exterior surface of the solid support.

The invention also provides devices and systems incorporating the chromatographic media of the invention. Thus, in an exemplary embodiment, the chromatographic medium is in a flow-through bed suitable for use as a chromatographic device. In an exemplary embodiment, the invention provides a chromatography column packed with the chromatographic medium of the invention.

In an exemplary embodiment, the device is a column packed with a chromatographic medium of the invention. The column hardware in one embodiment of the invention includes rigid tubes to be used as chromatographic columns, with various shapes including cylindrical, conical, rectangular, and polygonal or an assembly of these tubes. The tube may be made from any conventional materials know in the art including metal, glass, silica, plastic or other polymers, more preferably the stainless steel or glass. The inner dimension of this tube can be from micrometers to meters in diameter, thickness, width, or depth. The chromatographic medium may span the entire cross-section area of the tube where the separation of the samples take place by passing through the tube axially or radially (Lee, W-C, et al, "Radial Flow Affinity Chromatography for Trypsin Purification", Protein Purification (book), ACS Symposium Series 427, Chapter 8, American Chemical Society, Washington, D.C., 1990.) depending on the mode of separation, more specifically the axial or direct flow chromatography or the radial flow chromatography. The inner surface of the column may be non-reactive or may be treated to increase adhesion to the surface of chromatographic medium. The tube can incorporate any usable fittings know in the art to connect it with other instruments, more specifically chromatography instruments.

In various embodiments, the invention provides a chromatographic system. In an exemplary embodiment, the system is a high performance liquid chromatography (HPLC) system. Exemplary systems include one or more separation device, which contains a chromatographic medium of the invention. An exemplary system includes one or more separation device in line and in fluidic communication with one or more device for regulating eluent supply to the separation device, e.g., an eluent generator, a pump; one or more detection device, e.g., a mass spectrometric and/or fluorescence detector; and one or more means of introducing a sample on to the separation device, e.g., a sample injection valve.

By way of illustration, exemplary systems for HPLC analysis typically include a chromatographic separation zone using an eluent containing an electrolyte, and an eluent suppression stage, followed by detection, typically performed by mass spectrometer or a fluorescence detector. In the chromatographic separation stage, glycan components of an injected sample are eluted from a separation column.

Eluent is supplied from a source, which can includes a vessel containing premade eluent or it can be generated by an eluent generator. Eluent generators are known in the art. An exemplary eluent generator is disclosed in U.S. Pat. No. 7,767,462.

The invention is further illustrated by the Examples that follow. The Examples are not intended to define or limit the scope of the invention.

EXAMPLES

Preparation Ion Exchange/HILIC Bimodal Phases

Example 1

Preparation of Phase 12 (FIG. 2)

A solution of 11.58 g trimellitic anhydride chloride (1, Sigma-Aldrich) in 100 mL toluene (anhydrous) in a 500 mL was prepared in a round bottom flask, then the solution was cooled to 5° C. To this solution was slowly added a solution of 17.2 g bis(trimethoxysilylpropyl)amine (2, Gelest, Morrisville, Pa., U.S.A.), 10 mL triethylamine (10.0 mL) in 50 mL toluene with an addition funnel. After stirring at ambient temperature for 3 h, the reaction mixture was filtered off and the cake is washed with 10 mL toluene. The filtrate was then subjected to rotary evaporation under vacuum at 50° C. to give 25 g of silyl ligand 3 as a brownish viscous liquid.

25 g silyl ligand 3 and 50 g dried silica particles (particle size, 3 μm; pore size, 120 Å; surface area, 300 m$^2$/g) were mixed in 250 mL toluene. After carefully dispersing until uniformity, the reaction mixture was stirred and refluxed for 48 h. The functionalized silica particles were filtered off and thoroughly washed with acetone to give ~60 g Phase 11.

10 g Phase 11 were dispersed in 150 mL formic acid aqueous solution (1%) in a 250 mL flask equipped with a mechanical stirrer. After stirring at ambient temperature for 20 h, the reaction mixture was filtered, then the cake was washed with 100 mL acetone followed by 100 mL toluene. The cake was re-dispersed in 150 mL toluene (anhydrous) in a 250 mL flask equipped with a mechanical stirrer. After reflux for 48 h, the functionalized silica particles were filtered off and thoroughly washed with acetone to give ~10 g Phase 12.

In the same manner, Phases 13 and 14 were prepared from silica particles (particle size, 3 μm; pore size, 200 Å; surface area, 200 m$^2$/g) and raw silica particles (particle size, 3 μm; pore size, 300 Å; surface area, 100 m$^2$/g), respectively.

Example 2

Preparation of Phase 15 (FIG. 3)

10 g Ureidopropyltrimethoxysilane (4, Gelest) and 2 g 3-aminopropyltrimethoxysilane (5, Gelest) were dispersed in 30 mL toluene (anhydrous) in a 250 mL round-bottom flask. 15 g raw silica gel (particle size, 3 μm; pore size, 120-Å; surface area, 300 m$^2$/g) was added to above mixture, then it was mixed until uniform with mechanical stirring. After being maintained under reflux for 48 h, the reaction mixture was filtered, and the cake was washed with acetonitrile and dried in a vacuum oven at ambient temperature for 20 h to give Phase 15.

41

Example 3

Preparation of Phase 17 (FIG. 4)

10 g (3-Glycidoxypropryl)trimethoxysilane (6, Gelest) and 15 g raw silica gel (particle size, 5 µm; pore size, 120-Å; surface area, 300 m²/g) were dispersed in 50 mL toluene (anhydrous) in a 250 mL round-bottom flask. After mixing until uniform with mechanical stirring, the reaction mixture was kept under reflux for 48 h. The reaction mixture was filtered and the filter cake was washed with acetonitrile and dried in vacuum oven at ambient temperature for 20 h to give Phase 16.

4.0 g trimethylamine (45% wt in water, Aldrich) was dissolved in 15 mL dioxane in a 40-mL glass vial. 2.0 g Phase 16 was added to the vial and sealed with a screw cap. The resulting mixture was mixed until uniform. The reaction mixture was kept at 50° C. with gentle tumbling for 40 min. The reaction mixture was filtered followed by washing the cake with methanol (50 mL), 0.1% phosphoric acid aqueous solution (100 mL), D.I. water (50 mL) and acetonitrile (50 mL) to give Phase 17.

Example 4

Figure 5:
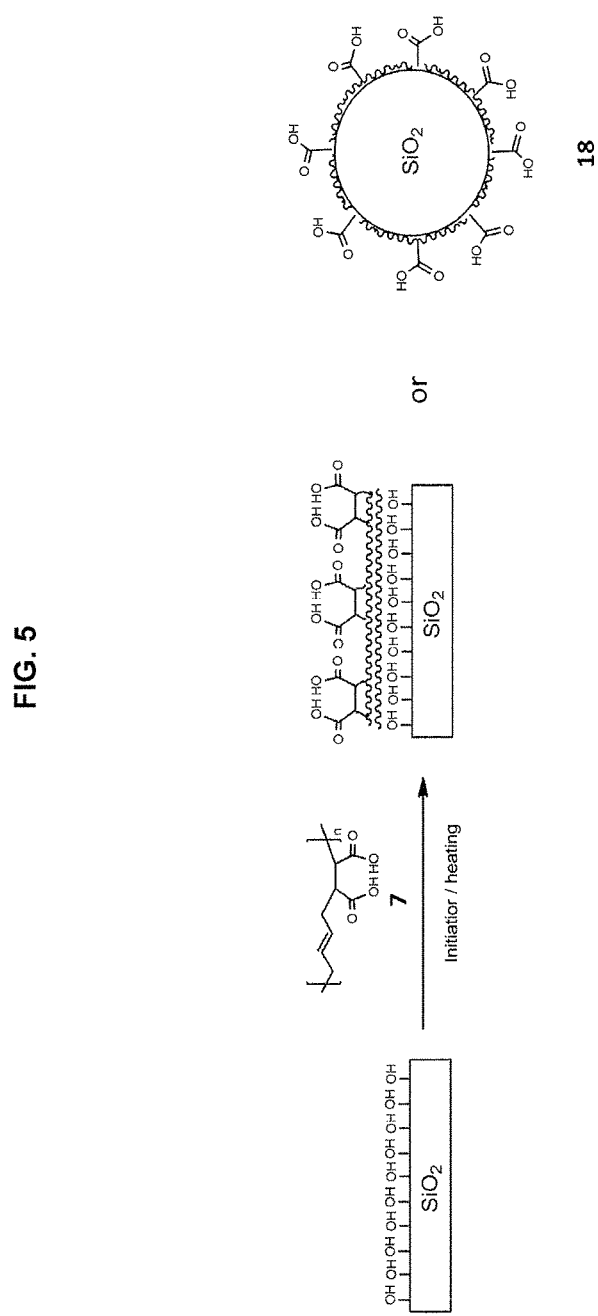
FIG. 5. Preparation of weak cation-exchange (WCX)/HILIC bonded phase by polymer encapsulation.

Preparation of Phase 18 (FIG. 5)

45 g Poly(butadiene maleic acid (7, 42% in water, Polysciences), 7 g dicumyl peroxide (initiator, Aldrich) and 55 g raw silica gel (particle size, 5 µm; pore size, 120-Å; surface area, 300 m²/g) was dispersed in 200 mL acetone in a 500 mL round-bottom flask. After mixing with sonication until uniform, the resulting mixture was subjected to rotary evaporation under vacuum to carefully remove all volatiles. Then under nitrogen atmosphere, the reaction was heated to 190° C. over 2-3 h and kept at this temperature for 16 h at the rate of 10 rotations/min. After cooling down the reaction to ambient temperature, the treated silica was subjected to a Soxhlet Extraction with acetone. The washed silica was then dried in vacuum oven at ambient temperature for 20 h to give Phase 18.

In the same manner, Phases 19 and 20 were prepared from raw silica particles (particle size, 3 µm; pore size, 200 Å; surface area, 200 m²/g) and raw silica particles (particle size, 3 µm; pore size, 300 Å; surface area, 100 m²/g), respectively. Preparation of Agglomerated Cation-Exchange/Anion-Exchange/HILIC Multimodal Phases

Example 5

Preparation of Phase 30, 31 and 32

A 50 mm by 3.0 mm (i.d.) 316 stainless steel HPLC column housing was packed with Phase 12 using the high-pressure slurry packing technique. Separately, 10 mL of the aminated latex solution (41) was adjusted to pH5 with an ammonium acetate buffer (2 M, pH5). The resulting latex solution was transferred into a 250-mL HPLC eluent bottle. A HPLC pump was used to wash the packed column with an ammonium acetate buffer (0.1M, pH5) at 0.2 mL/min for 30 min. The column was then treated with the latex solution at 0.2 mL/min until the latex particles were observed flowing out the exit of the column. Finally, the column was washed with an ammonium acetate buffer (0.1 M, pH5), D.I water, and 80% acetonitrile/20% ammonium acetate (0.1 M, pH5) to give a column packed with Phase 30.

Phases 31 and 32 were prepared in the same manner from Phases 13 and 14, respectively.

Example 6

Preparation of Phase 33

A 50 mm by 3.0 mm (i.d.) 316 stainless steel HPLC column housing was packed with Phase 15 using the high-pressure slurry packing technique. Separately, 10 mL of the carboxylate latex solution (42) was adjusted to pH 5 with an ammonium acetate buffer (2 M, pH5). The resulting latex solution was transferred into a 250-mL HPLC eluent bottle. A HPLC pump was used to wash the packed column with an ammonium acetate buffer (0.1 M, pH5) at 0.2 mL/min for 30 min. The column was then treated with the latex solution at 0.2 mL/min until the latex particles were observed flowing out the exit of the column. Finally, the column was washed with an ammonium acetate buffer (0.1 M, pH5), D.I water, and 80% acetonitrile/20% ammonium acetate (0.1 M, pH5) to give a column packed with Phase 33.

Example 7

Preparation of Phase 34

10 g Phase 17 was dispersed in 100 mL of ammonium acetate buffer (100 mM, pH 5) in a 1-L beaker. Separately, 100 mL of sulfonated latex solution (43) was adjusted to pH5 with an ammonium acetate buffer (2 M, pH5) in a beaker. The latex solution was added to the silica slurry and the resulting mixture was sonicated at ambient temperature for 3 h. The functionalized silica particles were filtered off and thoroughly washed with ammonium acetate buffer (0.1 M, pH5) and acetone to give Phase 34.

Example 8

Preparation of Phase 35, 36, 37

A 50 mm by 3.0 mm (i.d.) 316 stainless steel HPLC column housing was packed with Phase 18 using the high-pressure slurry packing technique. Separately, 10 mL of the aminated latex solution (41) was adjusted to pH 7-8 with a phosphate buffer (0.2 M, pH7 to 8). The resulting latex solution was transferred into a 250-mL HPLC eluent bottle. A HPLC pump was used to wash the packed column with an ammonium acetate buffer (0.1 M, pH5) at 0.2 mL/min for 30 min. The column was then treated with the latex solution at 0.2 mL/min until the latex particles were observed flowing out the exit of the column. Finally, the column was washed with an ammonium acetate buffer (0.1 M, pH5), D.I water, and 80% acetonitrile/20% ammonium acetate (0.1 M, pH5) to give a column packed with Phase 35.

Phases 36 and 37 were prepared in the same manner from Phases 19 and 20, respectively.

Example 9

Preparation of Phase 38

5 g Phase 21 (BioBasic SCX phase, Thermo Fisher Scientific) was dispersed in 100 mL of ammonium acetate buffer (100 mM, pH 5) in a 1-L beaker. Separately, 50 mL of aminated latex solution (41) was adjusted to pH5 with an ammonium acetate buffer (2 M, pH5) in a beaker. The latex solution was added to the silica slurry and the resulting mixture was sonicated at ambient temperature for 3 h. The functionalized silica particles were filtered off and thoroughly washed with ammonium acetate buffer (0.1 M, pH5) and acetone to give Phase 38.

Chromatography Evaluations

Example 10

Solvent Effect of Phase 30

Figure 6:
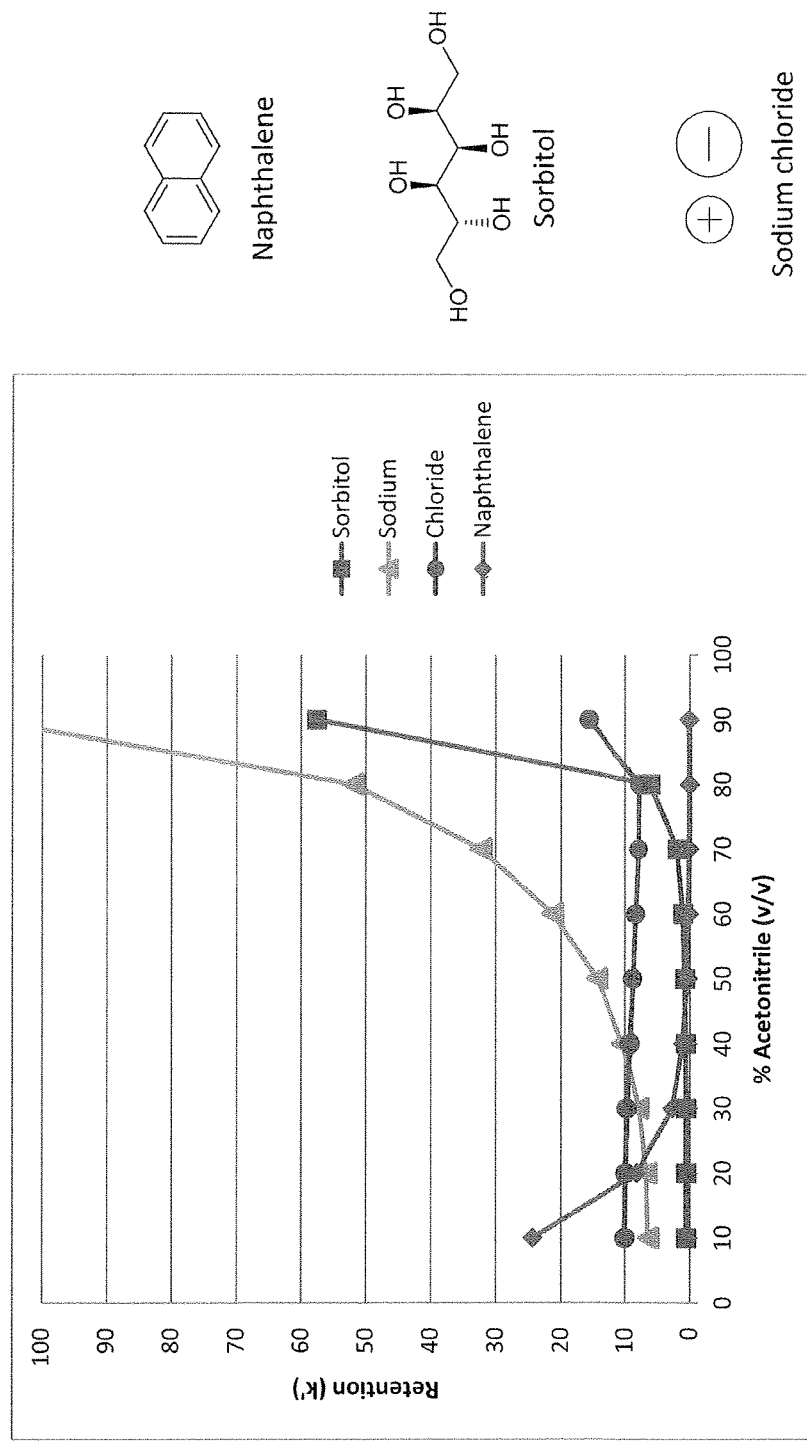
FIG. 6 is a plot of retention behavior (organic solvent effect). Column, Phase 30, 3 μm; Dimensions, 3.0×50 mm; Mobile Phase, acetonitrile and 100 mM $NH_4OFm$, pH3.65 buffer in different ratios; Temperature, 30° C.; Flow Rate, 0.6 mL/min; Inj. Volume, 1 μL; Detection, UV at 254 nm and Charged Aerosol Detection (CAD); Samples, sodium chloride, sorbitol, and naphthalene (1 mg/mL in mobile phase).

FIG. 6 shows the retention dependency versus organic solvent using naphthalene, sorbitol, $Na^+$ and $Cl^-$ as RP, HILIC, cation-exchange and anion-exchange probes, respectively. The retention time is depicted in the form of retention factor k'. Note that $k'=t_r-t_m/t_m$, where $t_r$ is the peak retention time and $t_m$ is the time for the mobile phase to pass through the column. As shown in FIG. 6, retention of naphthalene decreased with mobile phase acetonitrile increase. Above 40% acetonitrile, there was virtually no hydrophobic retention observed on Phase 30. On the other hand, the highly hydrophilic neutral molecule sorbitol exhibited no retention below 50% acetonitrile, and increasing retention with organic solvent when the solvent content is raised above 50% acetonitrile. Starting from 70% acetonitrile, sorbitol retention dramatically increased with mobile phase solvent content, suggesting strong HILIC interactions. As shown in FIG. 6, Phase 30 provided strong cation exchange and anion exchange retention, and retentions of ionic analytes such as $Na^+$ and $Cl^-$ were solvent-dependent. As organic solvent content increased, the ionization of stationary phase ion exchange functionalities decreased, resulting in less affinity of ionic analytes (e.g., $Na^+$ and $Cl^-$) towards opposite charges on the stationary phase or lower retentions. However, since the ionization of mobile phase ions, e.g., ammonium, also concurrently decreased, the mobile phase ionic strength became weaker resulting in longer retention times for the $Na^+$ and $Cl^-$ ions. Therefore, the ion-exchange process is a relative phenomenon, and retention dependency of ionic analytes on solvent content is the combination of many factors.

Test condition: column, Phase 30 (HILIC/weak cation exchange/strong anion exchange multimodal phase), 3-μm diameter average particle size, 3×50-mm column diameter and length; mobile phase, acetonitrile/100 mM ammonium formate, pH 3.65 buffer in different ratios; flow rate, 0.6 mL/min; injection volume, 1 μL; temperature, 30° C.; detection, aerosol based detector; and test probes (1 mg/mL in 50% acetonitrile): 1. Naphthalene; 2. Sorbitol; 3. Sodium Chloride. The charged aerosol detector nebulizes the effluent flow and creates charged particles that can be measured as a current proportional to the analyte concentration. Details regarding the charged aerosol detector can be found in U.S. Pat. Nos. 6,544,484; and 6,568,245, which are hereby fully incorporated by reference herein.

Example 11

Buffer Concentration Effect of Phase 30

Figure 7:
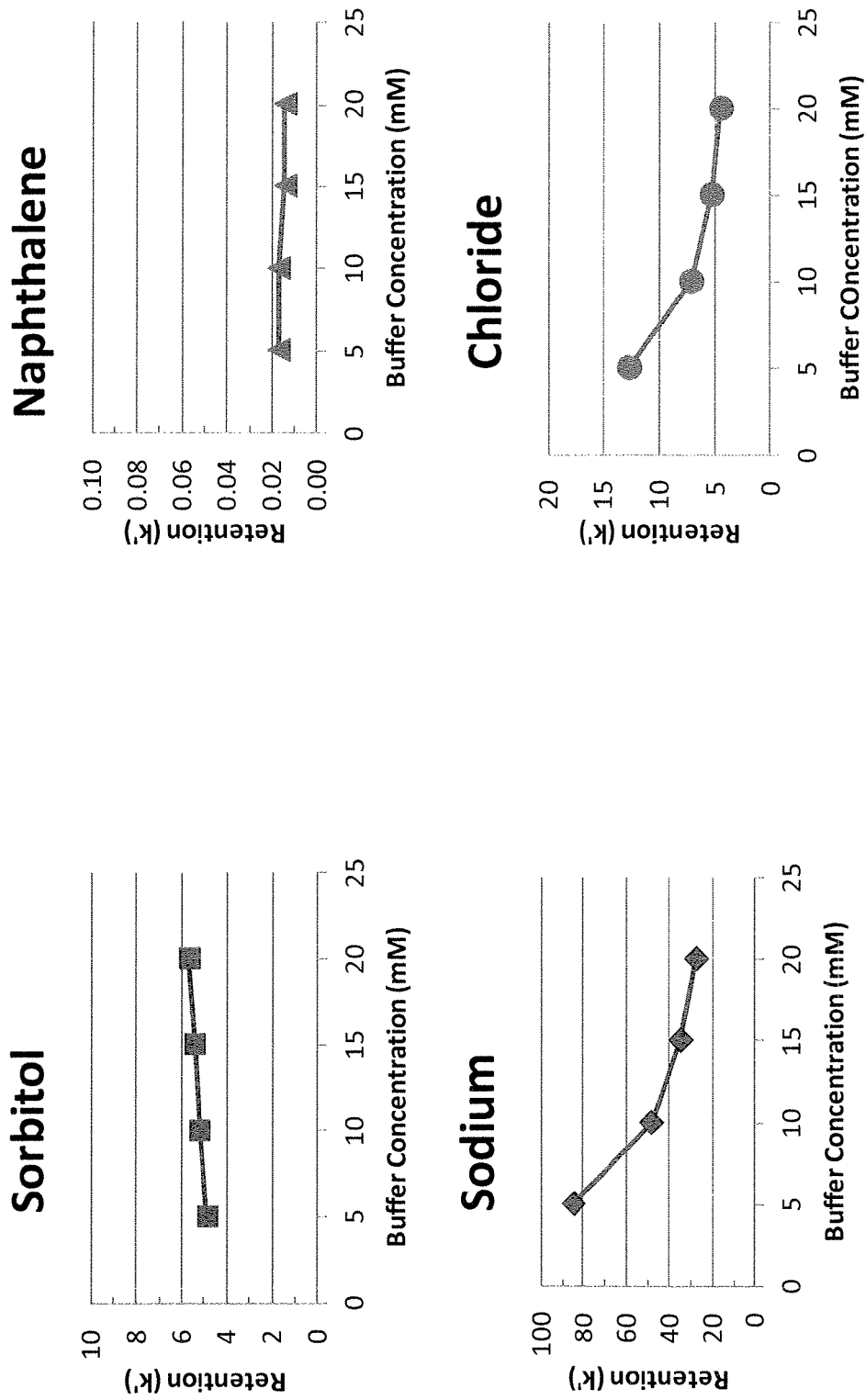
FIG. 7 is a plot of retention behavior (buffer concentration effect). Column, Phase 30, 3 μm; Dimensions, 3.0×50 mm; Mobile Phase, acetonitrile/$NH_4OFm$, pH3.65 buffer v/v 80/20 at different buffer concentrations; Temperature, 30° C.; Flow Rate, 0.6 mL/min; Inj. Volume: 1 μL; Detection, UV at 254 nm and Charged Aerosol Detection (CAD); Samples, sodium chloride, sorbitol, and naphthalene (1 mg/mL in mobile phase).

FIG. 7 shows the retention dependency on mobile phase buffer concentration. The retention of naphthalene (hydrophobic neutral molecule) exhibited little retention and was virtually unaffected by buffer concentration. Sorbitol showed good retention (k'>4) under test conditions (80% acetonitrile), which gradually increased with buffer concentration. Retention of $Na^+$ and $Cl^-$ decreased with buffer concentration increase, suggesting typical cation-exchange and anion-exchange mechanisms.

Test condition: column, Phase 30 (HILIC/weak cation exchange/strong anion exchange multimodal phase), 3-μm diameter average particle size, 3×50-mm column diameter and length; mobile phase, acetonitrile/ammonium formate, pH 3.65 buffer (in different buffer concentrations), 80/20 (v/v); flow rate, 0.6 mL/min; injection volume, 1 μL; temperature, 30° C.; detection, aerosol based detector; and test probes (1 mg/mL in 50% acetonitrile): 1. Naphthalene; 2. Sorbitol; 3. Sodium Chloride.

Example 12 pH Effect of Phase 30

Figure 8:
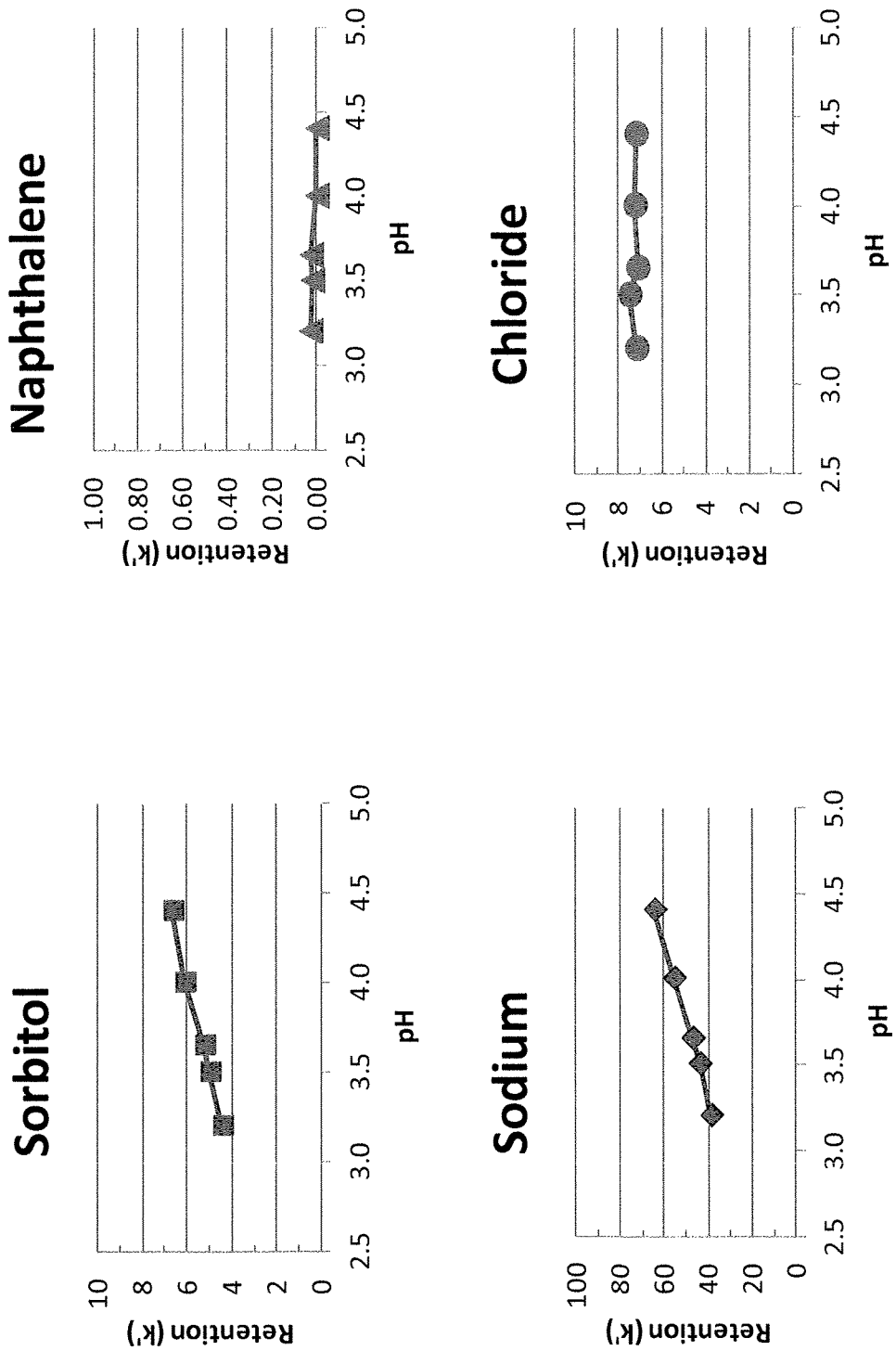
FIG. 8. is a plot of retention behavior (pH Effect). Column, Phase 30, 3 μm; Dimensions, 3.0×50 mm; Mobile Phase, Acetonitrile/10 mM $NH_4OFm$ buffer v/v 80/20 at different pH levels; Temperature, 30° C.; Flow Rate, 0.6 mL/min; Inj. Volume, 1 μL; Detection, UV at 254 nm and Charged Aerosol Detection (CAD); Samples, sodium chloride, sorbitol, and naphthalene (1 mg/mL in mobile phase).

To study the pH effect, Naphthalene, Sorbitol and NaCl are injected onto the column using mobile phases containing 80% acetonitrile (v/v) and 10 mM ammonium format buffer at various pH levels (from 3.5 to 4.5). FIG. 8 shows the retention dependency on mobile phase pH. The retention of Naphthalene (hydrophobic neutral molecule) exhibits little retention and is virtually unaffected by pH, while Sorbitol shows good retention (k'>4) which increases with pH. On the other hand, Phase 30 exhibits constant retention for $Cl^-$ at all pH levels tested while that for $Na^+$ increases with pH. The reason for these observations can be postulated as follows: Phase 30 has a distinctive spatial separation between the WCX region (in inner-pore area) and SAX region (on the outer surface). Therefore, the anion-exchange retention is governed by fully aminated nano-polymer beads on the outer surface whose ionization unaffected by pH change. Although the buffer concentration is normalized to ammonium ion thus the formate concentration slightly varies at different pH level, this effect must be negligible since retention for $Cl^-$ is virtually independent on the pH. Strong pH dependency for the retention of $Na^+$ is caused by the following factors. First, the ionization of stationary phase WCX functionalities ($pKa_1$~1.89 and $pKa_2$~5.51) are affected heavily by pH: increasing pH leads to higher ionization of the WCX functionality or longer retention for cations (e.g., $Na^+$). In addition, ionization of underivatized silanols on the silica surface increases with pH, resulting in increased electrostatic attraction between $Na^+$ and the stationary phase, making its retention even higher.

Test condition: column, Phase 30 (HILIC/weak cation exchange/strong anion exchange multimodal phase), 3-μm diameter average particle size, 3×50-mm column diameter and length; mobile phase, acetonitrile/100 mM ammonium formate buffer (at different pH levels), 80/20 (v/v); flow rate, 0.6 mL/min; injection volume, 1 μL; temperature, 30° C.; detection, aerosol based detector; and test probes (1 mg/mL in 50% acetonitrile): 1. Naphthalene; 2. Sorbitol; 3. Sodium Chloride.

Example 13

Comparison Between AEX/CEX/RP and AEX/CEX/HILIC Multimodal Phases

Figure 9:
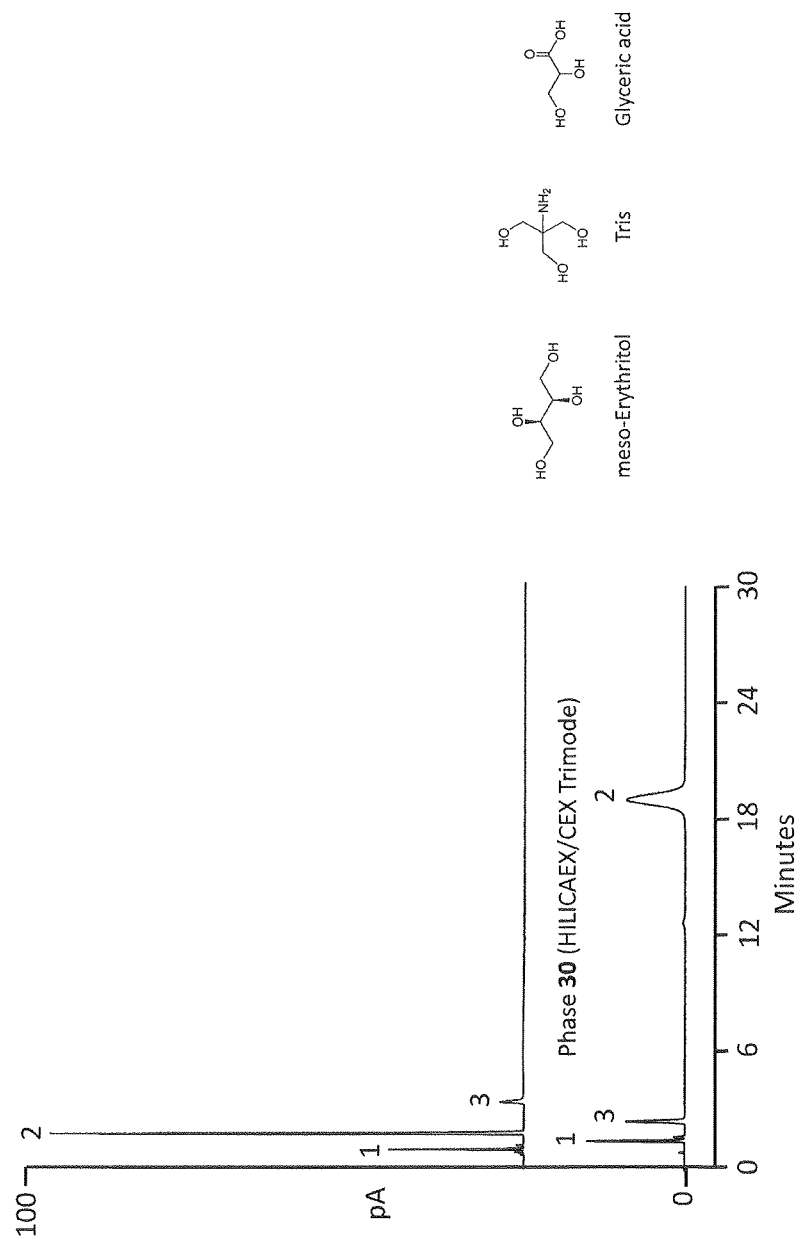
FIG. 9 is a comparison between AEX/CEX/HILIC Multimodal Phase (30) and AEX/CEX/RP Multimodal Phase (Acclaim Trinity P1. Column, Phase 30 and Acclaim Trinity P1, 3 μm; Dimensions, 3.0×50 mm; Mobile Phase, MeCN/100 mM $NH_4OFm$, pH 3.65 v/v 80/20; Temperature, 30° C.; Flow Rate, 0.50 mL/min; Inj. Volume, 2.5 μL; Detection, Charged Aerosol Detection (CAD); Peaks, (0.3 mg/mL each in mobile phase): 1. meso-erythritol; 2. Tris; 3. glyceric acid.

To study the retention behavior of a separation media under HILIC mode, three highly hydrophilic molecules with different charge states are used as the test probe—meso-Erythritol (neutral), Tris base and Glyceric acid (anionic). For comparison, Phase 30 (HILIC/weak cation exchange/strong anion exchange multimodal) and a commercial reversed-phase/weak anion exchange/strong cation exchange multimodal column are tested under the same condition. FIG. 9 demonstrates that Phase 30 provides significantly stronger HILIC interactions than the Trinity P1 phase as illustrated by a factor of four increase in k' for the neutral hydrophilic molecule meso-erythritol (k'=2.12 for Phase 30 and k'=0.53 for Trinity P1 phase). In addition, the basic probe Tris is retained on Phase 30 strongly, most likely caused by the combination of strong interactions at both the cation-exchange and hydrogen bonding sites under this condition. Compared to the Trinity P1 phase, Phase 30 exhibits different and complementary selectivity.

Test condition: column, Phase 30 and Acclaim Trinity P1 (reversed-phase/weak anion exchange/strong cation exchange multimodal phase, Thermo Fisher Scientific), 3-μm diameter average particle size, 3×50-mm column diameter and length; mobile phase, acetonitrile/100 mM ammonium formate, pH 3.65, 80/30 (v/v); flow rate, 0.5 mL/min; injection volume, 2.5 μL; temperature, 30° C.; detection, aerosol based detector; and test probes (0.3 mg/mL D.I. water): 1. meso-Erythritol; 2. Tris base; 3. Glyceric acid.

Applications

Example 14

Separation of Ions on Phase 30

Salt formation is important in drug development to improve biopharmaceutical and physicochemical properties of the drug. Approximately 50% of all drugs are formulated as salt forms. A broad selection of inorganic and organic ions can be used as pharmaceutical counterions. It is highly desirable to separate both pharmaceutically important anions and cations within the same analysis and in a reasonable amount of time. FIG. 10 illustrates that Phase 30 provides desired selectivity for the separation of mono- and multi-valent anions and cations—baseline resolution of a total of twelve ions including sodium, potassium, magnesium, calcium, chloride, bromide, nitrate, oxalate, citrate, sulfate, thiosulfate and citrate is achieved using a gradient method. This desired feature is provided by the unique phase design in which the cation-exchange capacity and anion-exchange capacity are carefully balanced for optimal selectivity for ion separations. It should be noted that this separation cannot be realized on any other separation media. Details regarding the evaporative light scattering detector (ELSD) can be found in U.S. Pat. Nos. 7,847,936; and 7,911,609; 8,089,627; and International Patent Publication No. WO2010068272A1, which are hereby fully incorporated by reference herein.

Test condition: column, Phase 30, 3-μm diameter average particle size, 3×50-mm column diameter and length; mobile phase, A—D.I. water, B—100 mM ammonium formate, pH 3.65; gradient, 10% B for 1 min, then ramp up to 100% B in 10 min, finally keep at 100% B for additional 9 min; flow rate, 0.6 mL/min; injection volume, 5 μL; temperature, 30° C.; detection, aerosol based detector; and test probes (0.05-0.10 mg/mL each in D.I. water): 1. Phosphate; 2. Sodium; 3. Potassium; 4. Chloride; 5. Bromide; 6. Nitrate; 7. Citrate; 8. Oxalate; 9. Sulfate; 10. Magnesium; 11. Calcium; 12. Thiosulfate.

Example 15

Separation of Sugars on Phase 30

Analysis of carbohydrates can be accomplished using ion chromatography, reversed-phase chromatography or gas chromatography, and Hydrophilic Interaction Liquid chromatography (HILIC). Among all, HILIC is an attractive approach because it offers superior separation of polar, hydrophilic compounds such as carbohydrates, is easy to use and works well where traditional reverse phase methodology fails. Phase 30 provides HILIC interactions in addition to anion-exchange and cation-exchange properties. FIG. 11 shows that both mono-saccharides (fucose and glucose) and di-saccharides (sucrose, maltose and lactose) can be sufficiently retained and separated on a 50-mm long column in 80% acetonitrile at 60° C.

Test condition: column, Phase 30, 3-μm diameter average particle size, 3×50-mm column diameter and length; mobile phase, acetonitrile/100 mM ammonium formate, pH 3.65, 80/20 (v/v); flow rate, 0.5 mL/min; injection volume, 2 μL; temperature, 60° C.; detection, aerosol based detector; and test probes (1 mg/mL each in 80% acetonitrile): Fucose, Glucose, Sucrose, Maltose and Lactose.

Example 16

Separation of Penicillin G and Potassium on Phase 30

Determinations of active pharmaceutical ingredients (APIs) and counter ions are important assays in pharmaceutical drug development. Due to the wide variety of charges and hydrophobicities of these pharmaceutical-related molecules, it is highly challenging to perform simultaneous separation of APIs and respective counter ions. Penicillin G is an antibiotic compound and is often formulated in the potassium salt form. Because of the highly hydrophilic nature of both API and counter ion, it is impossible to assay both components within the same analysis on any RP column. As shown in FIG. 12, the multimodal media Phase 30 provides baseline separation of both penicillin G and potassium ion with excellent resolution, good peak shape, and adequate retention.

Test condition: column, Phase 30, 3-μm diameter average particle size, 3×50-mm column diameter and length; mobile phase, acetonitrile/D.I. water/100 mM ammonium formate, pH 3.65, 25/50/25 (v/v/v); flow rate, 0.5 mL/min; injection volume, 1 μL; temperature, 30° C.; detection, aerosol based detector; and test probes (1 mg/mL D.I. water): Penicillin G, Potassium salt.

Example 17

Separation of Metformin and Chloride on Phase 30

1,1-Dimethylbiguanide hydrochloride (Metformin), a highly hydrophilic basic drug formulated in the chloride salt form, is an antidiabetic agent that reduces blood glucose levels and improves insulin sensitivity. FIG. 13 illustrates the separation of metformin and its counter ion—chloride using Phase 30 under HILIC mode with excellent resolution, good peak shape, and adequate retention.

Test condition: column, Phase 30, 3-μm diameter average particle size, 3×50-mm column diameter and length; mobile phase, acetonitrile/100 mM ammonium formate, pH 3.65, 80/20 (v/v); flow rate, 0.5 mL/min; injection volume, 1 μL; temperature, 30° C.; detection, aerosol based detector; and test probes (1 mg/mL D.I. water): Metformin hydrogen chloride.

Example 18

Separation of Metformin and Chloride on Phase 33

FIG. 13 illustrates the separation of metformin and its counter ion—chloride using Phase 33. Due to both the hydrophilic nature of the analytes and the multiple retention mechanisms (HILIC/WAX/WCX) facilitated by this phase, both API and its counter ion can be determined within the same analysis under HILIC mode, with excellent resolution, good peak shape, and adequate retention.

Test condition: column, Phase 33, 3-μm diameter average particle size, 3×50-mm column diameter and length; mobile phase, acetonitrile/100 mM ammonium acetate, pH 5.0, 90/10 (v/v); flow rate, 0.425 mL/min; injection volume, 1 μL; temperature, 30° C.; detection, aerosol based detector; and test probes (1 mg/mL D.I. water): Metformin hydrogen chloride.

Preparation of Nanometer-sized Charged Polymer Beads

Example 19

Preparation of Aminated Latex Particles (41)

A mixture of 32 g of vinylbenzylglycidylether (VBGE) and 2.7 g of 80% divinylbenzene (DVB) is added to 308 g of an aqueous solution containing 4.0 g of 70% Triton X-405 (a nonionic ethoxylated alkylphenol), 2.1 g of potassium persulfate, and 15 g of 8% potassium metabisulfite solution. The mixture is de-airated with nitrogen for 20 minutes. The bottle is capped and tumbled in a water bath held at 32° C. for 18 hours to complete the polymerization. To the resulting latex are then added 19.2 g of a 70% Triton X-405 solution in order to stabilize it. The white opaque mixture was filtered through a GF/A glass fiber filter paper to remove any coagulum and to afford 336 g of latex.

To 336 g of the above latex is added a mixture of 62.4 g of 1M nitric acid and 91.2 g of 5M methyldiethanol amine to form aminated, quaternized latex. The mixture is stirred for 10 minutes. An additional mixture of 144 g of 1M nitric acid and 384 g of 5M methyldiethanol is added and stirring is continued for 12 hours at 50° C. to give aminated vinylbenzylglycidyl ether/divinylstyrene copolymer 41 (6% crosslinking, particle diameter: 70 nm).

Example 20

Preparation of Carboxylated Latex Particles (42)

A mixture of 12 g of Glycidyl methacrylate (GMA) and 0.6 g of 80% divinylbenzene (DVB) is added to 400 g of an aqueous solution containing 10 g of 70% Triton X-405 (a nonionic ethoxylated alkylphenol), 2.5 g of potassium persulfate, and 0.6 g potassium metabisulfite. The mixture is de-airated with nitrogen for 20 minutes. The bottle is capped and tumbled in a water bath held at 32° C. for 18 hours to complete the polymerization. To the resulting latex are then added 19.2 g of a 70% Triton X-405 solution in order to stabilize it.

To above latex is added a solution of 12 g of diethylmethyl amine in 25 g of D.I. water. The resulting mixture is stirred at 50° C. for 2 h. Then add 120 g of sodium hydroxide aqueous solution (50% wt) to the latex. The resulting mixture is tumbled at 80° C. for 24 h. After cooling to room temperature, the latex solution is filtered through a GF/A glass fiber filter paper to the carboxylated latex 42 (5% crosslinking, particle diameter: 90 nm).

Example 21

Preparation of Sulfonated Latex Particles (43)

To a de-airated solution of 0.1 g calcium chloride dihydrate in water (350 g) under nitrogen is added a mixture of 21.66 g styrene, 1.42 g commercial 80.5% divinylbenzene, 0.14 g of Vazo 33 (2,2'-azobis(2,4-dimethyl-1-4-methoxyvaleronitrile), 3.66 g of Atlox 3403 F (blend of anionic and nonionic surfactants) and 1.09 g Atlox 3404 F. The bottle is capped and tumbled at 32° C. for 17 hours. To the mixture is then added 22 g of Igepal DM880 (ethoxylated dialkylphenol). The bottle is again capped and tumbled for 24 hours at 32° C. The reaction mixture was filtered using Whatman's GF/A, GF/D and GF/F filters to give the intermediate latex.

The above latex is sulfonated by adding 92.4 g of concentrated sulfuric acid to 20 g of the filtered latex. To the mixture is added chlorosulfonic acid (137 g). The mixture is heated at 80° C. for 2 hours and is then cooled to 60° C. The cooled mixture is added to 3.22M sodium hydroxide (1800 mL), then filtered through a Whatman #541 filter to remove coagulum to give sulfonated 4-methylstyrene/divinylstyrene copolymer 43 (5% crosslinking, particle diameter: 150 nm).

The present invention provides, inter alia, novel cyanine dyes, conjugates incorporating these dyes and method of using the dyes and conjugates. While specific examples have been provided, the above description is illustrative and not restrictive. Any one or more of the features of the previously described embodiments can be combined in any manner with one or more features of any other embodiments in the present invention. Furthermore, many variations of the invention will become apparent to those skilled in the art upon review of the specification. The scope of the invention should, therefore, be determined not with reference to the above description, but instead should be determined with reference to the appended claims along with their full scope of equivalents.

All publications and patent documents cited in this application are incorporated by reference in their entirety for all purposes to the same extent as if each individual publication or patent document were so individually denoted. By their citation of various references in this document, Applicants do not admit any particular reference is "prior art" to their invention.

What is claimed is:

1. An agglomerated multimodal chromatographic medium with hydrophilic interaction, cation exchange and anion exchange properties, said medium being suitable for use as chromatographic packing and comprising:

(a) component A comprising substrate particles functionalized with an ion exchange ligand comprising a negatively charged carboxylate ion exchange group, and a hydrophilic ligand comprising a neutral polar group, wherein neither said ion exchange ligand nor said hydrophilic ligand contain more than 5 non-aromatic carbon atoms in series and each of said ion exchange ligand and said hydrophilic ligand is bound to said substrate, and at least one of said ion exchange ligand, said hydrophilic ligand and a combination thereof has the formula:

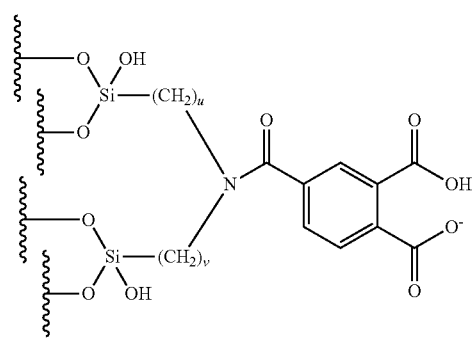

in which u and v are integers independently selected from the integers 1, 2, 3, 4, and 5; and (b) component B comprising particles of a second substrate having positively charged external surfaces,
wherein component A and component B are bound by electrostatic forces between said charged ion exchange ligand of component A and said charged external surfaces component B forming, in composite, an agglomerated medium of ion exchange particles.

2. The agglomerated multimodal chromatographic medium of claim 1 in which said polar group is a member selected from a protonated carboxylic acid, an amide, a urea, an alcohol, an ether, and a combination thereof.

3. The agglomerated multimodal chromatographic medium of claim 1 in which said component B positively charged external surfaces comprise a charged amine.

4. The agglomerated multimodal chromatographic medium of claim 1, wherein said component A substrate particles are porous.

5. The agglomerated multimodal chromatographic medium of claim 4 in which said ion exchange ligand and said hydrophilic ligand are bound to said substrate of component A both within and outside the pores of said substrate particles.

6. The agglomerated multimodal chromatographic medium of claim 4 in which said hydrophilic ligand is bound to said substrate of component A both within and outside the pores of said substrate particles and said ion exchange ligand is bound to said hydrophilic ligand.

7. The agglomerated multimodal chromatographic medium of claim 1 in which said hydrophilic ligand and said charged ion exchange ligand are the same ligand, said same ligand comprising both said ion exchange group and said neutral polar group.

8. The agglomerated multimodal chromatographic medium of claim 1 in which said hydrophilic ligand and said ion exchange ligand are polymerized onto said component A substrate particles.

9. The agglomerated multimodal chromatographic medium of claim 8 in which said hydrophilic ligand and said ion exchange ligand are is polymerized in situ onto said component A substrate particles.

10. The agglomerated multimodal chromatographic medium of claim 1 in which said hydrophilic ligand and said ion exchange ligand project from the surface of said substrate particles.

11. The agglomerated multimodal chromatographic medium of claim 1 in which a member selected from said ion exchange ligand, said hydrophilic ligand and a combination thereof of said component A substrate particles is covalently bound to said particles of component B.

12. The agglomerated multimodal chromatographic medium of claim 4, wherein the diameter of the pores of said component A substrate is smaller than the diameter of said second substrate.

13. The agglomerated multimodal chromatographic medium of claim 1 in which a member selected from said hydrophilic ligand, said ion exchange ligand and a combination thereof is a polymeric ligand and said component B substrate particles are entangled in said polymeric ligand.

14. The agglomerated multimodal chromatographic medium of claim 1 in which the diameter of the pores of said component A substrate is less than or equal to about 30 nm and the diameter of said particles of second substrate is greater than or equal to about 40 nm.

15. The agglomerated multimodal chromatographic medium of claim 1, wherein said substrate of component A is silica.

16. The agglomerated multimodal chromatographic medium of claim 15, wherein said neutral hydrophilic ligand and said ion exchange ligand are covalently bound to said substrate through one or more Si—O—Si or Si—O bond.

17. The agglomerated multimodal chromatographic medium of claim 1, wherein Component B is a latex particle.

18. The agglomerated multimodal chromatographic medium of claim 1, wherein said neutral hydrophilic ligand comprises a member selected from an amide moiety, a urea moiety and a combination thereof.

19. The agglomerated multimodal chromatographic medium of claim 1 in which said neutral hydrophilic group and said ion exchange group are structurally distinct groups.

20. The agglomerated multimodal chromatographic medium of claim 1 in which said medium is disposed in a chromatography column.

21. A method of liquid chromatography comprising separating ionic species in a liquid sample stream by flowing the stream in an eluent through the chromatography column of claim 20.

22. A method of liquid chromatography comprising separating organic species with a counterion in a liquid sample stream by flowing the stream in an eluent through the chromatography column of claim 20, wherein said eluent is an aqueous buffer.

23. A method of liquid chromatography comprising separating an anionic, cationic and neutral hydrophilic species, under HILIC conditions, by flowing the stream in an eluent through the chromatography column of claim 20, wherein said eluent is an aqueous buffer combined with a water miscible organic solvent.

24. A chromatographic system comprising the composition of claim 1 in a chromatographic column in fluidic communication with one or more of:
a) a suppressor;
b) an injection valve;
c) a source of eluent; and
d) a detector.

25. An agglomerated multimodal chromatographic medium with hydrophilic interaction, cation exchange and anion exchange properties, said medium being suitable for use as chromatographic packing and comprising:
(a) component A comprising substrate particles functionalized with an ion exchange ligand comprising a negatively charged carboxylate ion exchange group, and a hydrophilic ligand comprising a neutral polar group, in which at least one of said ion exchange ligand, said hydrophilic ligand and a combination thereof-has the formula:

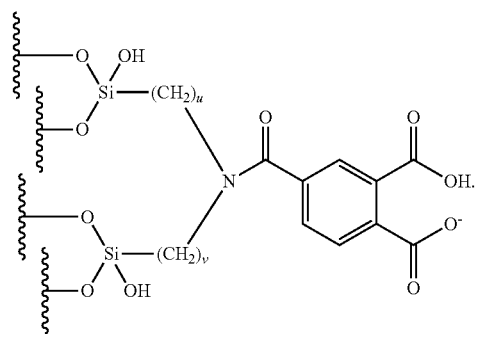

in which u and v are integers independently selected from the integers 1, 2, 3, 4, 5, 6, 7, 8, 9, and 10; and
(b) component B comprising particles of a second substrate having positively charged external surfaces, wherein component A and component B are bound by electrostatic forces between said charged ion exchange ligand of component A and said charged external surfaces component B forming, in composite, an agglomerated medium of ion exchange particles.

* * * * *